US00RE45757E

(19) United States
(12) Reissued Patent
Quayle et al.

(10) Patent Number: US RE45,757 E
(45) Date of Reissued Patent: Oct. 13, 2015

(54) CELLULAR WIRELESS INTERNET ACCESS SYSTEM USING SPREAD SPECTRUM AND INTERNET PROTOCOL

(75) Inventors: Roger Phillip Quayle, Burlingame, CA (US); Shirley Claire Quayle, legal representative, Paraparaumu (NZ); William John Jones, Chippenham (GB); Alan Edward Jones, Wiltshire (GB)

(73) Assignee: NVIDIA CORPORATION, Santa Clara, CA (US)

(21) Appl. No.: 11/510,861

(22) Filed: Aug. 25, 2006

Related U.S. Patent Documents

Reissue of:

(64) Patent No.: 6,865,169
Issued: Mar. 8, 2005
Appl. No.: 09/432,824
Filed: Nov. 2, 1999

(51) Int. Cl.

| | |
|---|---|
| ***G06F 15/177*** | (2006.01) |
| ***G06F 15/16*** | (2006.01) |
| ***H04M 3/00*** | (2006.01) |
| ***H04W 4/00*** | (2009.01) |

(Continued)

(52) U.S. Cl.
CPC ..... *H04L 63/083* (2013.01); *H04L 63/0853* (2013.01); *H04L 67/14* (2013.01); *H04L 69/329* (2013.01); *H04W 8/265* (2013.01); *H04W 12/06* (2013.01)

(58) Field of Classification Search
USPC ..... 370/335, 216, 235, 231, 332, 479, 328; 455/561, 446, 137
See application file for complete search history.

(56) References Cited

U.S. PATENT DOCUMENTS 4,593,155 A 6/1986 Hawkins
5,442,625 A * 8/1995 Gitlin et al. ..... 370/342

(Continued)

FOREIGN PATENT DOCUMENTS

EP 0467534 1/1992
EP 0817518 1/1998

(Continued)

OTHER PUBLICATIONS

Rigney, C. Radius Accounting, RFC 2059, Jan. 1997, pp. 1-22, http://www.jetf.org/rfc/rfc2059.txt?number=2059.

(Continued)

*Primary Examiner* — Andrew Wendell
*Assistant Examiner* — Cindy Trandai

(57) ABSTRACT

A cellular wireless internet access system which operates in the 2.5 to 2.68 GHz band and which must comply with complex government regulations on power levels, subscriber equipment and interference levels yet which provides high data rates to users and cell sizes of 1½ miles radius or more from base stations with subscriber equipment and antennas mounted indoors. Such base stations are mounted low and use spread-spectrum transmission to comply with interference rules with respect to adjacent license areas. An unidirectional tear-drop coverage pattern is used at multiple cells to further reduce interference when required. Time division duplex is used to allow the system to operate on any single channel of varying bandwidth within the 2.5 to 2.68 GHz band. Backhaul transmission from base stations to the Internet is provided using base station radio equipment, operating either on a different frequency in the band or on the same frequency using a time-division peer-to-peer technique. Different effective data-rates are provided by a prioritization tiering technique.

31 Claims, 18 Drawing Sheets

System Architecture

(51) Int. Cl.

| | |
|---|---|
| ***H04L 29/06*** | (2006.01) |
| *H04L 29/08* | (2006.01) |
| *H04W 12/06* | (2009.01) |
| *H04W 8/26* | (2009.01) |

(56) References Cited

U.S. PATENT DOCUMENTS

| | | | | |
|---|---|---|---|---|
| 5,517,491 | A * | 5/1996 | Nanni et al. | 370/252 |
| 5,610,841 | A * | 3/1997 | Tanaka et al. | 725/115 |
| 5,638,371 | A * | 6/1997 | Raychaudhuri et al. | 370/310.2 |
| 5,684,791 | A | 11/1997 | Raychaudhuri et al. | |
| 5,745,480 | A * | 4/1998 | Behtash et al. | 370/252 |
| 5,889,958 | A | 3/1999 | Willens | |
| 5,933,421 | A * | 8/1999 | Alamouti et al. | 370/330 |
| 5,940,771 | A | 8/1999 | Gollnick et al. | |
| 5,956,636 | A | 9/1999 | Lipsit | |
| 5,999,812 | A | 12/1999 | Himsworth | |
| 6,047,177 | A * | 4/2000 | Wickman | 455/422 |
| 6,061,650 | A | 5/2000 | Malkin et al. | |
| 6,064,879 | A | 5/2000 | Fujiwara et al. | |
| 6,115,390 | A * | 9/2000 | Chuah | 370/443 |
| 6,119,160 | A | 9/2000 | Zhang et al. | |
| 6,144,849 | A | 11/2000 | Nodoushani et al. | |
| 6,151,628 | A | 11/2000 | Xu et al. | |
| 6,157,829 | A | 12/2000 | Grube et al. | |
| 6,188,899 | B1 | 2/2001 | Chatterjee et al. | |
| 6,192,242 | B1 | 2/2001 | Rollender | |
| 6,198,920 | B1 | 3/2001 | Doviak et al. | |
| 6,212,390 | B1 | 4/2001 | Rune et al. | |
| 6,243,372 | B1 * | 6/2001 | Petch et al. | 370/350 |
| 6,243,866 | B1 * | 6/2001 | Rudolph et al. | 725/123 |
| 6,272,129 | B1 | 8/2001 | Dynarski et al. | |
| 6,295,291 | B1 | 9/2001 | Larkins | |
| 6,308,069 | B1 | 10/2001 | Freitag et al. | |
| 6,320,851 | B1 * | 11/2001 | Kim et al. | 370/320 |
| 6,324,402 | B1 | 11/2001 | Waugh et al. | |
| 6,334,057 | B1 | 12/2001 | Malmgren et al. | |
| 6,351,458 | B2 | 2/2002 | Miya et al. | |
| 6,370,384 | B1 * | 4/2002 | Komara | 455/447 |
| 6,373,831 | B1 * | 4/2002 | Secord et al. | 370/342 |
| 6,374,112 | B1 * | 4/2002 | Widegren et al. | 455/452.2 |
| 6,377,955 | B1 | 4/2002 | Hartmann et al. | |
| 6,381,454 | B1 | 4/2002 | Tiedemann, Jr. et al. | |
| 6,393,408 | B1 | 5/2002 | Mosher et al. | |
| 6,400,966 | B1 * | 6/2002 | Andersson et al. | 455/561 |
| 6,421,714 | B1 | 7/2002 | Rai et al. | |
| 6,453,414 | B1 | 9/2002 | Ryu | |
| 6,466,556 | B1 | 10/2002 | Boudreaux | |
| 6,490,445 | B1 | 12/2002 | Holmes | |
| 6,490,667 | B1 | 12/2002 | Ikeda | |
| 6,515,989 | B1 | 2/2003 | Ronneke | |
| 6,519,461 | B1 | 2/2003 | Andersson et al. | |
| 6,567,850 | B1 | 5/2003 | Freishtat et al. | |
| 6,571,290 | B2 | 5/2003 | Selgas et al. | |
| 6,574,211 | B2 | 6/2003 | Padovani et al. | |
| 6,577,862 | B1 | 6/2003 | Davidson et al. | |
| 6,577,874 | B1 | 6/2003 | Dailey | |
| 6,587,433 | B1 | 7/2003 | Borella et al. | |
| 6,587,684 | B1 | 7/2003 | Hsu et al. | |
| 6,618,592 | B1 | 9/2003 | Vilander et al. | |
| 6,628,671 | B1 | 9/2003 | Dynarski et al. | |
| 6,628,934 | B2 | 9/2003 | Rosenberg et al. | |
| 6,628,942 | B1 | 9/2003 | Beming et al. | |
| 6,675,208 | B1 | 9/2003 | Rai et al. | |
| 6,636,894 | B1 | 10/2003 | Short et al. | |
| 6,665,718 | B1 | 12/2003 | Chuah et al. | |
| 6,681,099 | B1 | 1/2004 | Keranen et al. | |
| 6,687,252 | B1 | 2/2004 | Bertrand et al. | |
| 6,714,931 | B1 | 3/2004 | Papierniak et al. | |
| 6,718,332 | B1 | 4/2004 | Sitaraman et al. | |
| 6,728,884 | B1 | 4/2004 | Lim | |
| 6,760,303 | B1 | 7/2004 | Brouwer et al. | |
| 6,760,416 | B1 | 7/2004 | Banks et al. | |
| 6,785,823 | B1 | 8/2004 | Abrol et al. | |
| 6,804,720 | B1 | 10/2004 | Vilander et al. | |
| 6,826,166 | B2 | 11/2004 | Yokoyama et al. | |
| 6,839,339 | B1 | 1/2005 | Chuah | |
| 6,853,630 | B1 | 2/2005 | Manning | |
| 6,865,169 | B1 | 3/2005 | Quayle et al. | |
| 6,873,609 | B1 | 3/2005 | Jones et al. | |
| 6,879,832 | B1 | 4/2005 | Palm et al. | |
| 6,894,994 | B1 | 5/2005 | Grob et al. | |
| 6,917,617 | B2 | 7/2005 | Jin et al. | |
| 6,920,559 | B1 | 7/2005 | Nessett et al. | |
| 6,980,515 | B1 | 12/2005 | Schunk et al. | |
| 7,065,340 | B1 | 6/2006 | Einola et al. | |
| 7,076,240 | B2 | 7/2006 | Holmes | |
| 7,079,499 | B1 | 7/2006 | Akhtar et al. | |
| 7,149,229 | B1 | 12/2006 | Leung | |
| 7,327,757 | B2 | 2/2008 | Ghahremani et al. | |
| 7,346,043 | B1 | 3/2008 | Olshansky et al. | |
| 7,373,151 | B1 * | 5/2008 | Ahmed | 455/452.2 |
| 7,408,940 | B2 | 8/2008 | Jin et al. | |
| 7,412,528 | B2 | 8/2008 | Mir et al. | |
| 7,676,556 | B2 | 3/2010 | Goldstein | |
| 7,797,236 | B1 | 9/2010 | Liu et al. | |
| 7,840,458 | B2 | 11/2010 | Liu et al. | |
| 2001/0001268 | A1 | 5/2001 | Menon et al. | |
| 2002/0010683 | A1 | 1/2002 | Aune | |
| 2002/0068612 | A1 * | 6/2002 | Carey et al. | 455/562 |
| 2007/0195941 | A1 * | 8/2007 | Pedersen | 379/177 |

FOREIGN PATENT DOCUMENTS

| | | |
|---|---|---|
| EP | 0918417 | 10/1998 |
| EP | 0917328 | 5/1999 |
| EP | 0986222 | 8/1999 |
| GB | 2348778 | 4/1999 |
| JP | 10243120 | 9/1998 |
| JP | 11098254 | 4/1999 |
| WO | WO-9901969 | 1/1999 |
| WO | WO-0000904 | 1/2000 |
| WO | WO 00/08803 | 2/2000 |
| WO | WO-00/25475 A1 | 5/2000 |
| WO | WO 00/38391 | 6/2000 |
| WO | WO-0044148 | 7/2000 |
| WO | WO-0046963 | 8/2000 |
| WO | WO-0128168 | 4/2001 |
| WO | WO-0131843 | 5/2001 |
| WO | WO-0141470 | 6/2001 |
| WO | WO-0167706 | 9/2001 |
| WO | WO-0167716 | 9/2001 |
| WO | WO-0169858 | 9/2001 |
| WO | WO-0197060 | 12/2001 |
| WO | WO-0211467 | 2/2002 |
| WO | WO-02/41597 A2 | 5/2002 |

OTHER PUBLICATIONS

Rigney, C. Radius Accounting, RFC 2139, Jun. 2000, pp. 1-25, http://www.jetf.org/rfc/rfc2866.txt?number=2866.

Rigney, C. Radius, RFC 2138, Apr. 1997, pp. 1-22, http://www.jetf.org/rfc/rfc2138.txt?number=2138.

Dahlman, Erik et al. (Nov. 1998) "WCDMA—The Radio Interface for Future Mobile Multimedia Communications," *IEEE Transactions on Vehicular Technology,* 47(4): 1105-1118.

3rd Generation Partnership Project 2 "3GPP2". (Jul. 1999). "Physical Layer Standard for cdma2000 Spread Spectrum Systems," 3GPP2 C.S0002-0 Version 1.0, 369 pages.

Bender, P. et al. (Jul. 2000). "CDMA/HDR: A Bandwidth-Efficient High-Speed Wireless Data Service for Nomadic Users," *IEEE Communications Magazine,* pp. 70-77.

Ekstein, R. et al. (April). "AAA Protocols: Comparison Between Radius, Diameter and Cops," AAA Working Group, Internet-Draft, located at <http://tools.ietf.org/html/draft-ekstein-aaa-protcomp-00> visited on Sep. 12, 2007. (29 pages).

Great Britain Examination Report mailed May 13, 2003, for GB 0118393.8, 3 pages.

Great Britain Examination Report mailed May 7, 2003, for GB 0118392.0, 3 pages.

Great Britain Search Report mailed Mar. 18, 2002, for GB 0118391.2, 3 pages.

(56) References Cited

OTHER PUBLICATIONS

Great Britain Search Report mailed Mar. 18, 2002, for GB 0118392.0, 3 pages.
Great Britain Search Report mailed Mar. 18, 2002, for GB 0118393.8, 3 pages.
Great Britain Search Report mailed May 14, 2002, for GB 0127567.6, 2 pages.
Qualcomm. (Oct. 2006). "Commonalities Between CDMA2000 and WCDMA Technologies," Qualcomm Incorporated, pp. 1-46.
TSG RAN. (Jul. 6-7, 1999). "Liaison from ITU-R TG 8/1 on the Approval of Recommendation IMT.RSPC and on the Provision of Relevant Information from External Organizations," 3GPP/PCG Meeting #2, 3GPP/PCG#2(99)5, 58 pages.
U.S. Appl. No. 09/626,582, filed Jul. 27, 2000 for Williams et al.
U.S. Appl. No. 09/626,699, filed Jul. 27, 2000 for Jones et al.
U.S. Appl. No. 09/626,700, filed Jul. 27, 2000 for Jones et al.
Japanese Office Action (with translation) dated May 19, 2011 from Japanese Patent Application No. 2002-515857.
Japanese Patent Laid-Open No. 11-98254 published Apr. 9, 1999 with translation of abstract.
Japanese Office Action (with partial translation) dated May 19, 2011 from Japanese Patent Application No. 2002-515857.
"Connection to Internet II, To use accessible ISDN, TRY! PC," CQ publication Corporation, vol. 9, No. 9, pp. 138-144, Sep. 1, 1997.
"To Master Computer Communications," Yomiuri PC, vol. 2, No. 2, Yomiuri News Papers Co., Ltd., pp. 16-17, Feb. 1, 1997.
"To Use Pre-Installed Software to Subscribe Personal Communication Network Service Via Online" in "Basic Personal Computer No. 5 (Email)," NIKKEI BP Muk, NIKKEI BP Co. Ltd., pp. 50-53, Aug. 1, 1998.
Mizutani et al., "To Prepare a Personal Computer Environment by Subscribing to a Provider," NIKKEI PC 21, vol. 3, NIKKEI BP Co., Ltd., pp. 172-176, May 1, 1998.
Translation of Japanese Final Rejection Dated Feb. 15, 2011 from Japanese Patent Application No. 2002-515859.
RFC:2604, Wireless Device Configuration (OTASP?OTAPA) via ACAP, Jun. 1999.

* cited by examiner

System Architecture

Basestation (NodeB)

User Equipment (UE)

Core Network

FCC Interference Rules

Interference Avoidance

Prior Art:- Typical Cellular Wireless Coverage Pattern

Interference Reduction - Unidirectional Teardrop Cellular Wireless Coverage Pattern RF Channel Utilization Multiple Bearer Transmission CDMA Backhaul Transmission Peer to Peer Backhaul Routing Distributed Core Network Functions Service Tiering Enhanced Time-Division-Duplex Transmission Rate Adaption Transmission Rate Adaption Channel Measurement Successive Interference Cancellation

CELLULAR WIRELESS INTERNET ACCESS SYSTEM USING SPREAD SPECTRUM AND INTERNET PROTOCOL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

The present invention is directed to a Cellular Wireless Internet Access System using spread spectrum and Internet Protocol (IP) and more specifically to a system which typically operates in the 2.5 to 2.68 GigaHertz (GHz) frequency band in the U.S.A., but which is also capable of operating in other bands in the U.S.A. or other countries.

BACKGROUND OF THE INVENTION

Serving the mass market of high-speed Internet access to small business and residential consumers with wireless technology requires either a large amount of radio spectrum or radio transmission techniques which efficiently use the radio spectrum or both. Especially in the United States it is difficult to identify a frequency band with a large amount of spectrum that is sufficiently free and designated by the Federal Communications Commission for such use. Also, the frequency band must have suitable propagation characteristics for the geography being served as well as being available and licensed for the specific application.

Another significant factor is that, as in present cellular telephone systems, power and signal levels must be restricted and reuse of frequencies managed to prevent interference amongst the spectrum users and to neighboring frequencies.

Finally, in order to be able to practically and efficiently serve a very large number of subscribers in a given geographic area (those subscribers with personal computers needing high-speed Internet connections on a wireless basis), it is necessary to provide technology that is able to be installed by the subscriber and to operate inside a building without an external antenna, provide coverage of all buildings within an area and furthermore to utilize base stations which can be easily deployed without delays due to site acquisition and environmental or zoning approvals.

OBJECT AND SUMMARY OF THE INVENTION

It is therefore an object of the present invention to provide an improved Cellular Wireless Internet Access System that meets the above requirements. Specifically, the object is to provide the optimum combination of high data rate, cell size, ubiquitous in-building coverage, regulatory compliance, interference avoidance and management, and overall quality of service.

In accordance with the above object, there is provided a Cellular Wireless Internet Access System comprising a plurality of cellular base stations located at low ground level for transmitting and receiving in a predetermined frequency band. Such frequency band has interference sources and recipients in other license areas, the signals from or to low ground level base stations causing or suffering the interference are attenuated by foliage, building penetration, building clutter and terrain losses.

A plurality of portable subscriber terminals each having a directly-attached antenna communicates in the frequency band with a nearby cellular base station. A substantial proportion of the plurality of portable subscriber terminals are located in buildings. The cellular base stations have low-to-ground level mounting for reduced environmental impact but a high enough system gain and a geographically frequent location in close proximity to any one of the portable subscriber terminals to overcome the above mentioned losses and both transmit and receive to and from subscriber terminals in the buildings.

Other features of the system include techniques for operating in small allocations of radio spectrum, providing high system capacity, providing high speed service to subscriber terminals located inside of buildings, routing of backhaul transmissions through adjacent or nearby base stations, interference reduction techniques, distributed core network functions, tiering of subscriber service speeds and enhanced time division duplex modes to allow operation for both transmission and reception on a single frequency. All of the foregoing is built on the foundation of a direct-sequence spread-spectrum wideband Code-Division-Multiple-Access (CDMA) type of system which provides the highest performing combination of coverage, in-building signal penetration, data transmission rates and subscriber capacity, and allows the use of techniques to reduce the effects of interference.

DETAILED DESCRIPTION OF PREFERRED EMBODIMENTS

Figure 1:
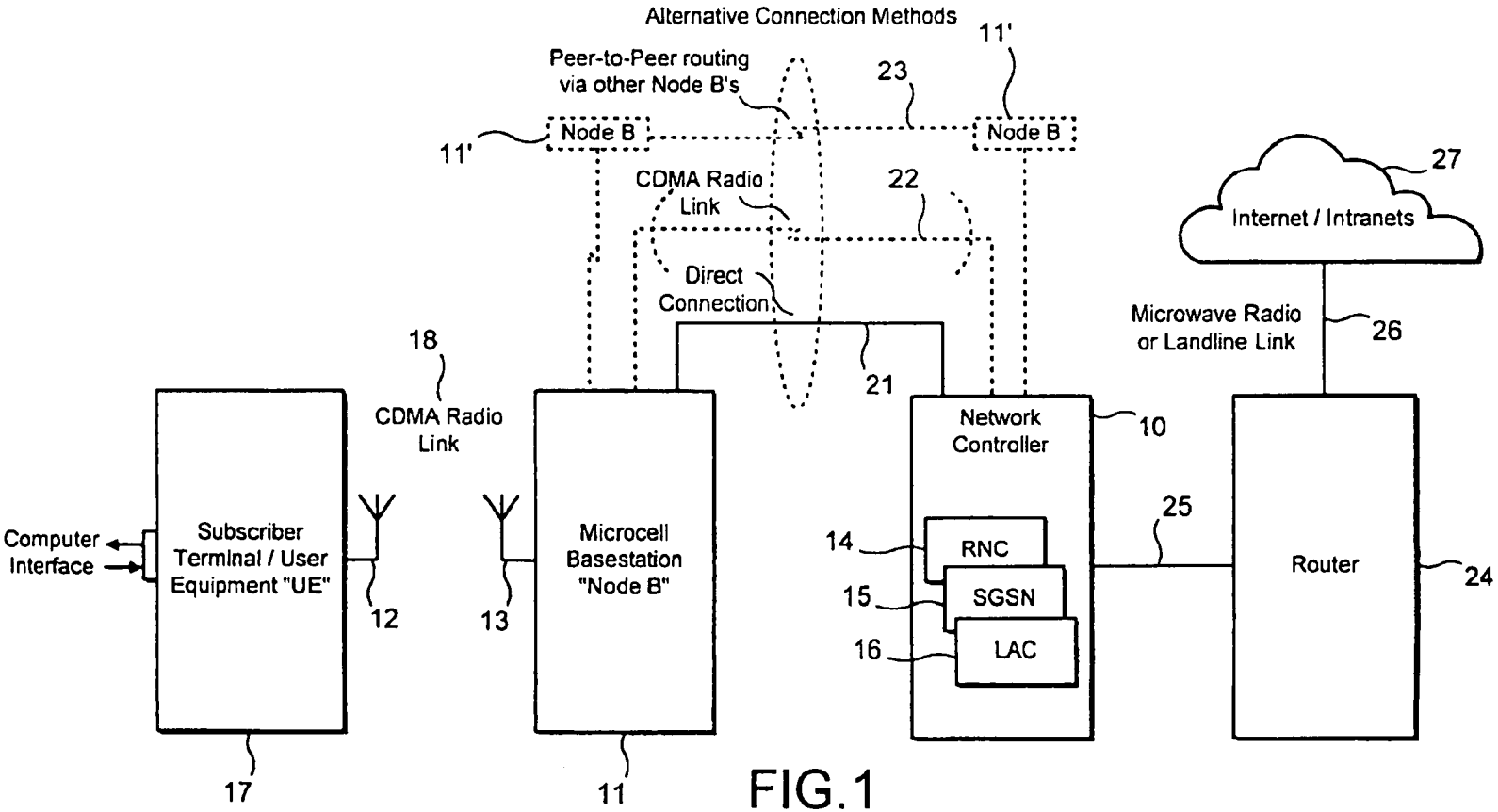
FIG. 1 is a block diagram of an overview of the Cellular Wireless Internet Access System of the present invention.

Referring now to FIG. 1, the wireless aspects of the cellular Wireless Internet Access System of the present invention is broadly based on a wideband code division multiple access (W-CDMA) system which is derived from European third-generation (3G) cellular wireless standards and also known by the acronyms UMTS for Universal Mobile Telephone Service and UTRAN for Universal Terrestrial Radio Access Network but which has enhancements. Using such a standard as a basis in the present system to meet the application requirements of high speed wireless Internet access provides a very flexible wireless or "air interface" supporting a range of net subscriber data rates typically up to 6 megabits per second. Also, radio channel bandwidths from 5 to 20 MHz are supported. By choosing to use the CDMA spread spectrum concept the present system provides for lower error rates, higher speed communication and also immunity to several types of interference, especially the ability to deal with multipath signals which would otherwise be detrimental to the system performance.

However, as will be discussed in greater detail below, the present cellular wireless Internet access system has been specifically designed to meet the special and particular requirements of the selected frequency band (especially for the United States) which has the large amount of available spectrum that is required for high speed mass market Internet access is at 2.5-2.68 GHz. This band is known as the "MMDS" (for Multi-channel Multi-point Distribution Service) and "ITFS" (for Instructional Television Fixed Service) bands (hereinafter referred to collectively as "MMDS"). In the United States, a Federal Communications Commission (FCC) rule making in 1998 opened these bands for two-way communication services. A subsequent FCC "Report and Order on Reconsideration" of Jul. 29, 1999 made further changes to the requirements for operation in these bands. But as will be discussed below, through the rules imposed by the FCC, there are complex requirements regarding interference between licenses in adjacent markets; in other words, the service operator must be able to deal with interference with adjacent license areas, and at the same time minimize interference that he originates into such adjacent license areas.

The present invention will operate in this MMDS frequency band using a technology optimized for packet data based on a modified version of the Time-Division-Duplex (TDD) version of the UMTS UTRAN air interface standard. The optimizations and modifications to the TDD UTRAN standard are listed below.

1. Modification for operation in the MMDS Band and compliance with the FCC regulations (Frequency, bandwidths and radio transmission requirements).
2. Optimization of the UTRAN protocols (user polling and allocation) and bearer channel improvements to efficiently support packet data.
3. Modifications to the UTRAN air interface to support higher data rates (up to 6 Mbps) to subscriber equipment with antennas mounted inside buildings and cell sizes larger than 1.5 miles in radius.

As such, the present system is wireless telecommunications access technology providing low cost, high quality, and high speed Internet services to residential and small to medium business customers with net packet data rates up to 6 Mbps, the gross burst data rate being up to 30.72 Mbps of coded data. Through the use of Time-Division-Duplex, the system can operate on any discrete channel of between 6 MHz and 24 MHz (including necessary guard band) anywhere in the MMDS band in contrast to the prior art of Frequency-Division-Duplex that requires paired channels separated by a predetermined guard band. The system operates in a non-line-of-site multipath radio environment and provides indoor coverage. The subscriber equipment is user installable. The system supports user portability and roaming in its total coverage area.

The system provides "tiering" of service that allow subscribers to receive different data rate throughput based on the type of service they have subscribed to. For example, the definition of the lowest tier of service may provide an equivalent throughput to a dedicated channel of 384 kbps per second whilst the highest tier of service may be a 1536 kbps per second equivalent.

End-to-end connectivity is built on the TCP/IP protocol suite. User data is carried over the radio network using the PPP protocol and tunneled to an ISP (for Internet Service Provider) using the Layer 2 Tunneling Protocol (L2TP).

The system has the capacity to serve a large number of subscribers in urban and suburban areas, for example more than 1000 subscribers per square kilometer.

Referring now specifically to FIG. 1, a network of base stations 11, one of which is illustrated, provides coverage of the target market. The base station is also referred to as "NODE B" which is nomenclature from the UMTS standard. Each low-mounted base station 11 with an omni directional antenna 13 provides a radius of coverage of approximately 0.5 miles. Alternatively, three base stations 11 may be configured in a sectored coverage pattern with directional antennas to serve a 1 to 1.5 mile radius. The radius of coverage may be further increased depending on the radio environment and the height of the base station antenna. Located within the base station coverage configuration are hundreds of subscriber terminals 17 also designated user equipment (UE in UMTS nomenclature). The subscriber terminal 17 has an attached omni directional antenna 12 (suitable for in-building use) which communicates via a code division multiple access (CDMA) radio link 18 to the antenna 13 of base station 11. The subscriber terminal 17 typically connects to the user's personal computer via standard computer interfaces. It generally requires no external antenna and is user installable. Base stations 11 are assigned to a particular network controller 10 by three types of connections, using another technology such as point to point radio, direct landline etc. 21, a CDMA radio link 22, or a peer-to-peer routing link 23 using other NODE B type radio stations 11. Peer-to-peer routing will be discussed below. The subscriber terminal may also provide a voice over IP service (VOIP), a digitized packetized voice service for provision of local telephone access service.

In general, network controller 10 controls user traffic to the Internet Service Providers (ISP) using the layer 2 tunneling protocol (L2TP) on top of User Datagram Protocol (UDP) and Internet Protocol (IP) and/or Asynchronous Transfer Mode (ATM) over a high speed fiber or microwave link 25. This is aggregated and routed over a private ATM network via an Internet router 24. The microwave radio or land-line link 26 is then connected to the Internet/intranet global communication network 27.

Figure 4:
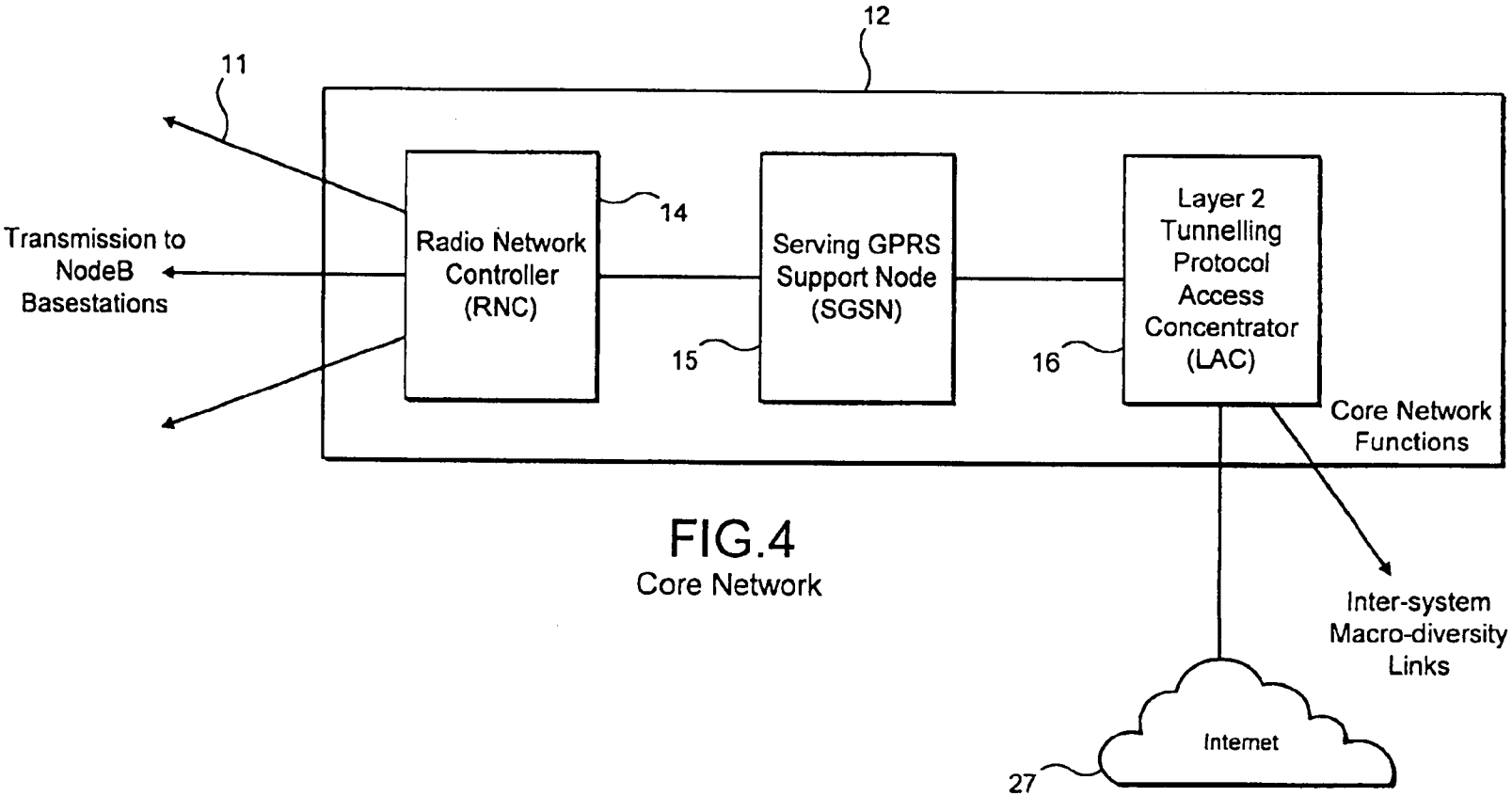
FIG. 4 is a block diagram of a core portion of FIG. 1.

Network controller 10 as illustrated in FIG. 1 has three units designated RNC (Radio Network Controller) 14, SGSN (Serving General Packet Radio Service Node) 15 and the Layer 2 Tunneling Protocol Access (LAC) 16 which tunnels traffic through the Internet to the Internet Service Provider (ISP) or other destination. All of these are illustrated in FIG. 4 in greater detail. Also, as illustrated in FIG. 4, there are macro-diversity links supporting a diversity transmission scheme (not fully discussed) which allow a subscriber in the overlap area of two or more base stations using the same channel (who would otherwise suffer excessive interference) to receive simultaneously from the two base stations and likewise to transmit to two base stations simultaneously combating the detrimental effect of interference and radio path fading in both links.

Specifically the RNC 14, controls and allocates the radio network resources and provides reliable delivery of user traffic between the base station and subscriber terminal, the SGSN 15 provides session control, and lastly, LAC 16 provides the gateway functionality to the Internet service provider and to the registration, location and authentication registers using a layer 2 tunneling protocol.

In-building operation without an external antenna is achieved through the use of the base stations located typically within 1 to 1.5 miles of each subscriber terminal location to allow a signal margin for building penetration signal loss and other losses; in other words, the base stations have a high enough system gain, mounting at building roof top level (on utility poles) and a geographically frequent location in proximity to a selected portable subscriber terminal to provide a high enough power to overcome building penetration attenuation of the signal in both directions to and from subscriber terminals in the building. Secondly, the implementation of spread spectrum wideband CDMA transmission technology in the present system mitigates the detrimental effect of multiple reflected signals or multipaths.

Cellular base stations 11 are designed so that they can be mounted on utility poles or on buildings thus avoiding zoning/environmental approvals and leasing delays typically associated with traditional cellular telephone towers. Such mounting is enabled by the relatively low power of the base stations 11 which is made possible by the use of spread spectrum transmission which inherently allows low power operation but with a high data rate and low error rate, the cellular structure where the base stations are in close proximity to subscriber terminals, and the use of peer-to-peer routing through other cellular base stations to the network controller to facilitate the deployment and interconnection of base stations.

Thus, in summary the subscriber terminal 17 functions to provide a connection between the subscriber's computer(s) and also any voice-over-IP (VoIP) connection and the network controller, which then connects to the Internet or Intranets as desired.

Similarly, each cellular base station 11 provides a radio connection to multiple subscriber terminals within its coverage area and the connection to the network controller 10.

Figure 2:
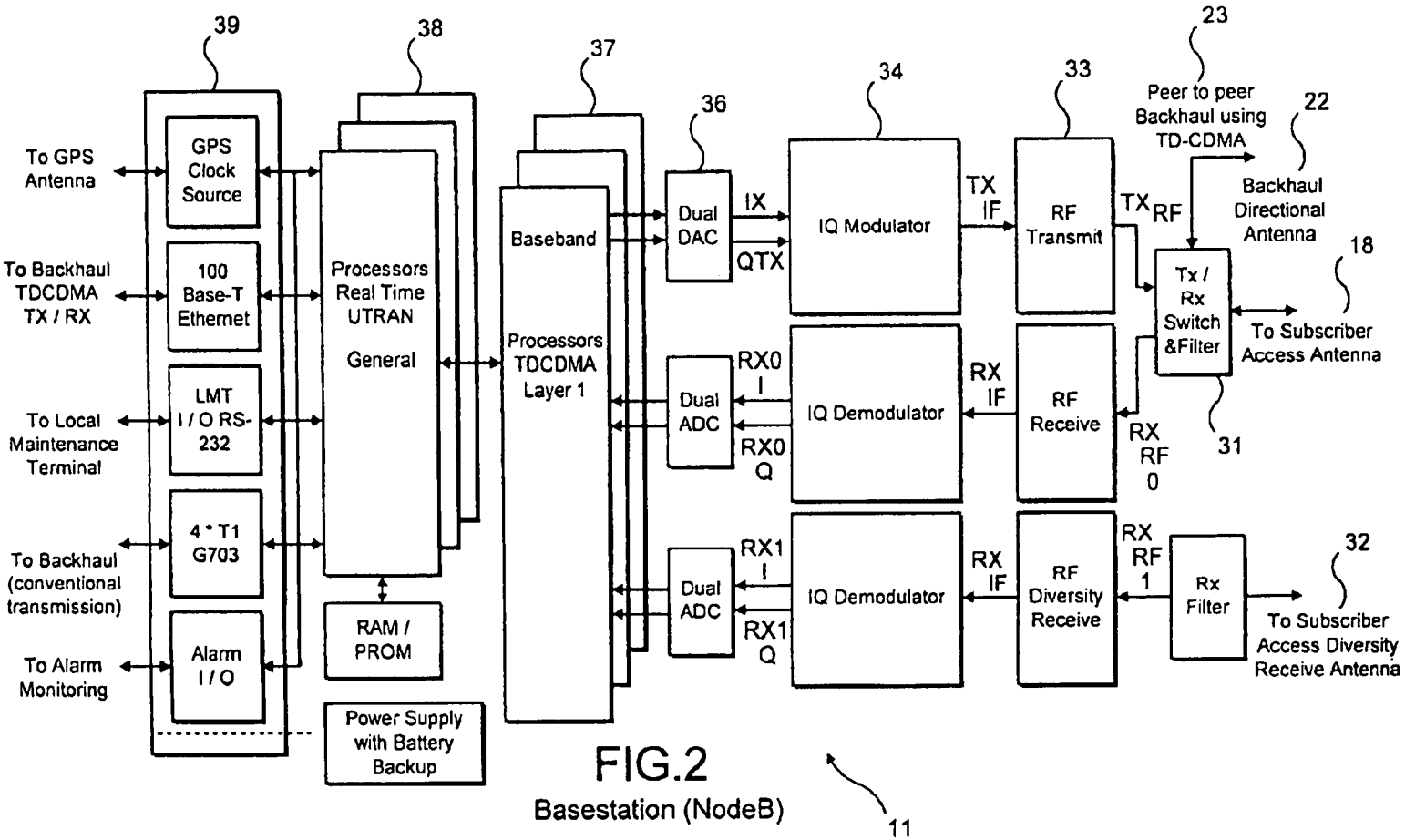
FIG. 2 is a block diagram of a base station.

A typical NODE B base station 11 is illustrated in FIG. 2 and conforms in part to UTRAN/UMTS standards. A transmit/receive switch 31 is connected both to a subscriber access antenna 18, and also the backhaul directional antenna 22 as illustrated in FIG. 1. The subscriber access diversity receive antenna 32 is a specialized antenna configuration to improve system performance. The antenna inputs are amplified in the RF stage 33, demodulated at 34 or modulated as the case may be and converted from digital to analog, or vice versa. At the stage 36 they are digitally processed by the processor units 37 and 38 and then connected to the network controller 10 and then to router 24 on line 25 as illustrated in FIG. 1 and eventually the Internet. The various interfaces illustrated at 39 use industry standard formats.

Figure 3:
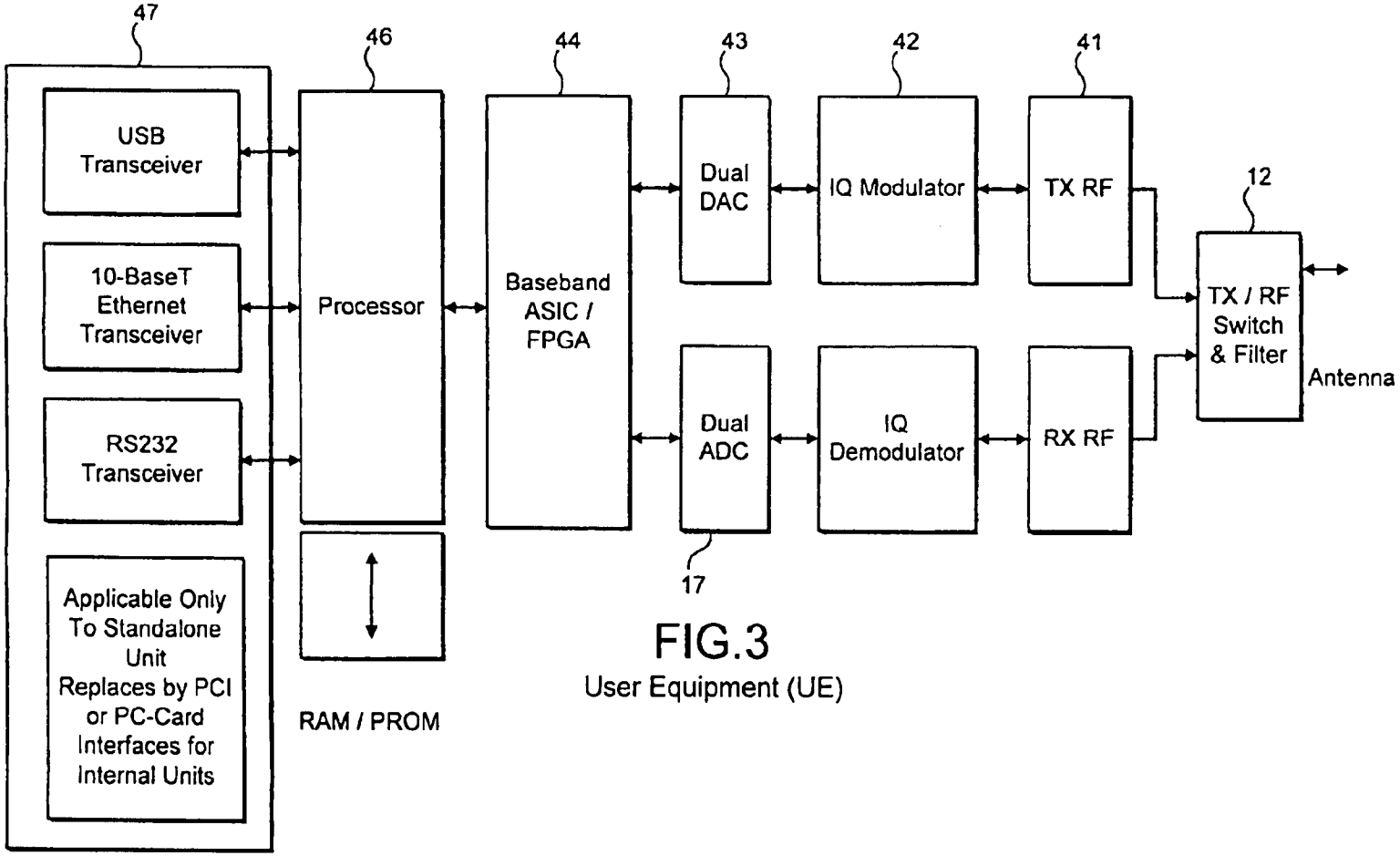
FIG. 3 is a block diagram of a subscriber terminal or user equipment.

FIG. 3 illustrates the subscriber terminal user equipment 17 where the antenna 12 communicates with a base station 11 and these communications are processed through transmit and receive radio frequency stages 41, modulator, demodulator stages 42, digital to analog and analog to digital converters 33, digital processing unit 44 and finally the processor 46 which interfaces at 47 with various computer user interfaces. Again, some aspects of the user equipment comply with the standards discussed above.

Figure 5:
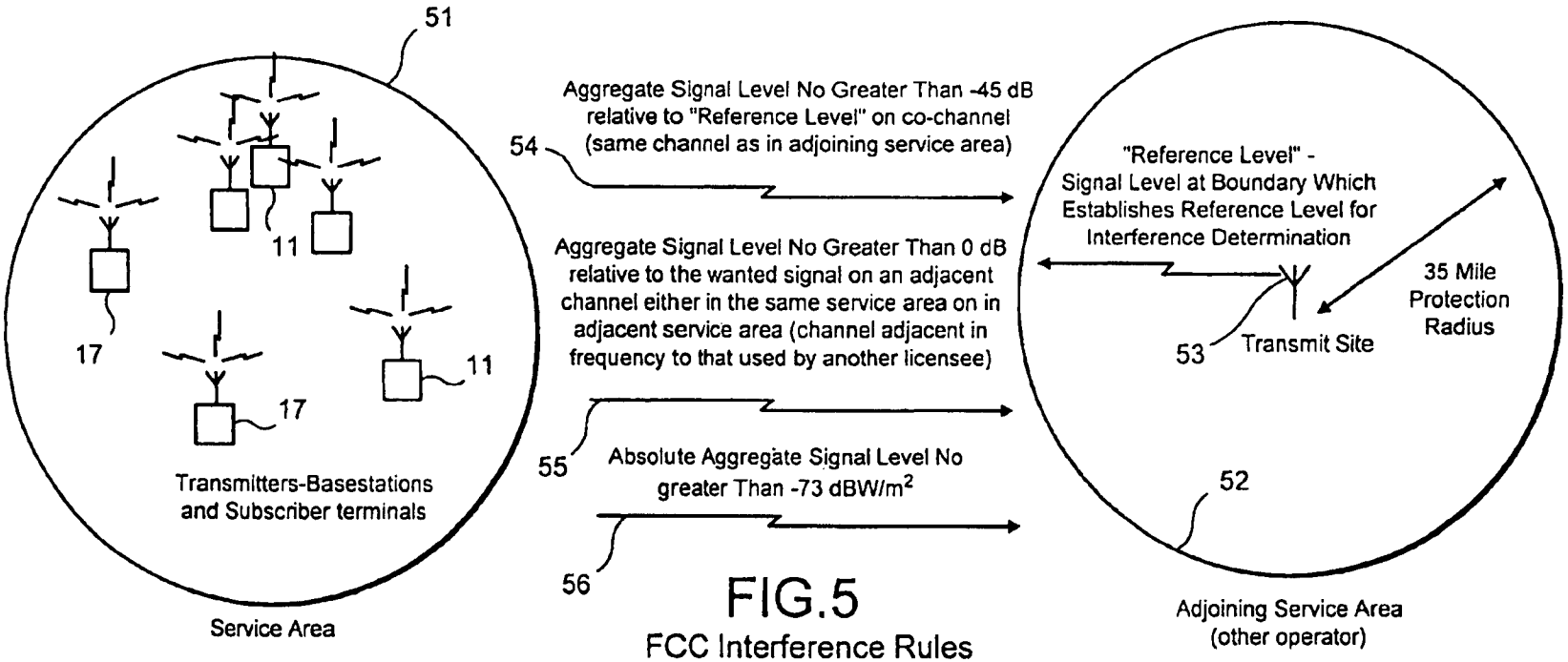
FIG. 5 is an illustration of interference between a Cellular Wireless Internet Access System service area and an adjoining service area of another operator as specified by the Federal Communications Commission.

FIG. 5 illustrates United States Federal Communication's Commission's interference rules for an MMDS licensee who must comply with FCC co-channel and adjacent channel interference rules in order to protect other licensees on adjacent or nearby channels. Unlike normal cellular or PCS license allocation, the MMDS licensee is usually allocated individual channel frequencies on a per-city basis within a 35-mile radius service area around that city. In conventional operation in the MMDS band, large cells are used with a radius up to 35 miles with a base station mounted on a high tower or hilltop. The present system is designed to operate with smaller cells of particularly 0.5 to approximately 1.5 miles radius in a normal urban or suburban environment.

Finally, traditional technologies using the MMDS band use line-of-sight transmission whereas the present system is designed to operate without line-of-sight and with a signal to penetrate buildings.

FIG. 5 relates to interference between the cellular service areas designated by the circle 51 and an adjoining service area by another operator designated by the circle 52 which, as illustrated, has a 35 mile radius around the transmit site 53. As discussed above, the 2.5-2.68 GHz frequency band at least in the United States, already has interfering or other remote interference sources and/or recipients, for example, 53. Thus, under the rules that have been provided by the United States Federal Communications Commission for any new cellular service area, indicated as 51, both subscriber terminals 17 and base stations 11 must have a low enough power so as not to interfere with the adjoining service area 52. And, as indicated by the arrows 54, 55 and 56, such possibly interfering transmissions must obey the following three rules:

1. Aggregate signal level no greater than the −65 dB relative to "reference level" on a co-channel (same channel as an adjoining service area). The "reference Level" is a field strength level determined by the level of signal transmitted by the operator in the adjoining area when measured at the 35 mile boundary.
2. Aggregate signal level no greater than 0 dB relative to the wanted signal level on an adjacent channel (channel adjacent in frequency to that used by another licensee).
3. Absolute aggregate signal level no greater than −73 dBW/m2 at the boundary of an adjoining service area Furthermore, the FCC "Report and Order on Reconsideration" of Jul. 29, 1999

1. Removes the requirement for the use of directional antennas at subscriber equipment (referred to by the FCC as "response stations" where the transmitted power is less than −6 dBW Effective Isotropic Radiated Power (EIRP) (250 milliwatts)
2. Removes the need for professional installation of subscriber equipment in a situation where the transmitted power is less than −6 dBW EIRP (250 milliwatts). In situations where the transmitted power is greater than −6 dBW EIRP (250 milliwatts) but less than 18 dBW (63 watts) professional installation is only required within 150 feet of an existing ITFS Instructional Television Fixed Service receive site
3. (Power levels specified above are for a 6 MHz channel in the case of a channel wider or narrower than 6 MHz the allowable power is adjusted proportionately.)

The invention complies with the above described and other FCC requirements. In general, the techniques used by the invention to comply with these FCC regulations (and to combat interference) include the following.

1. The use of spread spectrum wideband modulation as implemented in the present system reduces the transmitter power level required for a given base station to subscriber terminal path and service data rate. Thus, for example, the maximum power for a subscriber terminal is approximately 0.25 watts, which is significantly below the applicable FCC limit of 2 watts and is compliant with the FCC "Report and Order on Reconsideration." The effective radiated power of a cellular base station is substantially below the applicable FCC limit of 2,000 watts.
2. Dynamic power control is used which sets and continually adjusts the transmitted power levels to the minimum required to maintain a viable link between subscriber and base station (not shown).
3. The location of both subscriber terminals and base stations at low elevations above the surrounding ground level on average so that the surrounding building and foliage attenuation and terrain losses reduce the signal originated towards its distant receiver locations in adjacent service areas.
4. The location of subscriber terminal transmit antennas typically inside the subscriber premises such that building penetration losses further attenuate the signal originated toward distant receiver locations in adjacent or joining service areas.
5. High system gain defined as a high permissible path loss between transmitter and receiver which is achieved by the use of multiple simultaneous data bearers each operating at a lower rate than the required aggregate data rate, the use of orthogonal spreading codes on the downlink, and successive interference cancellation of multiple codes used on the uplink.

Figure 6:
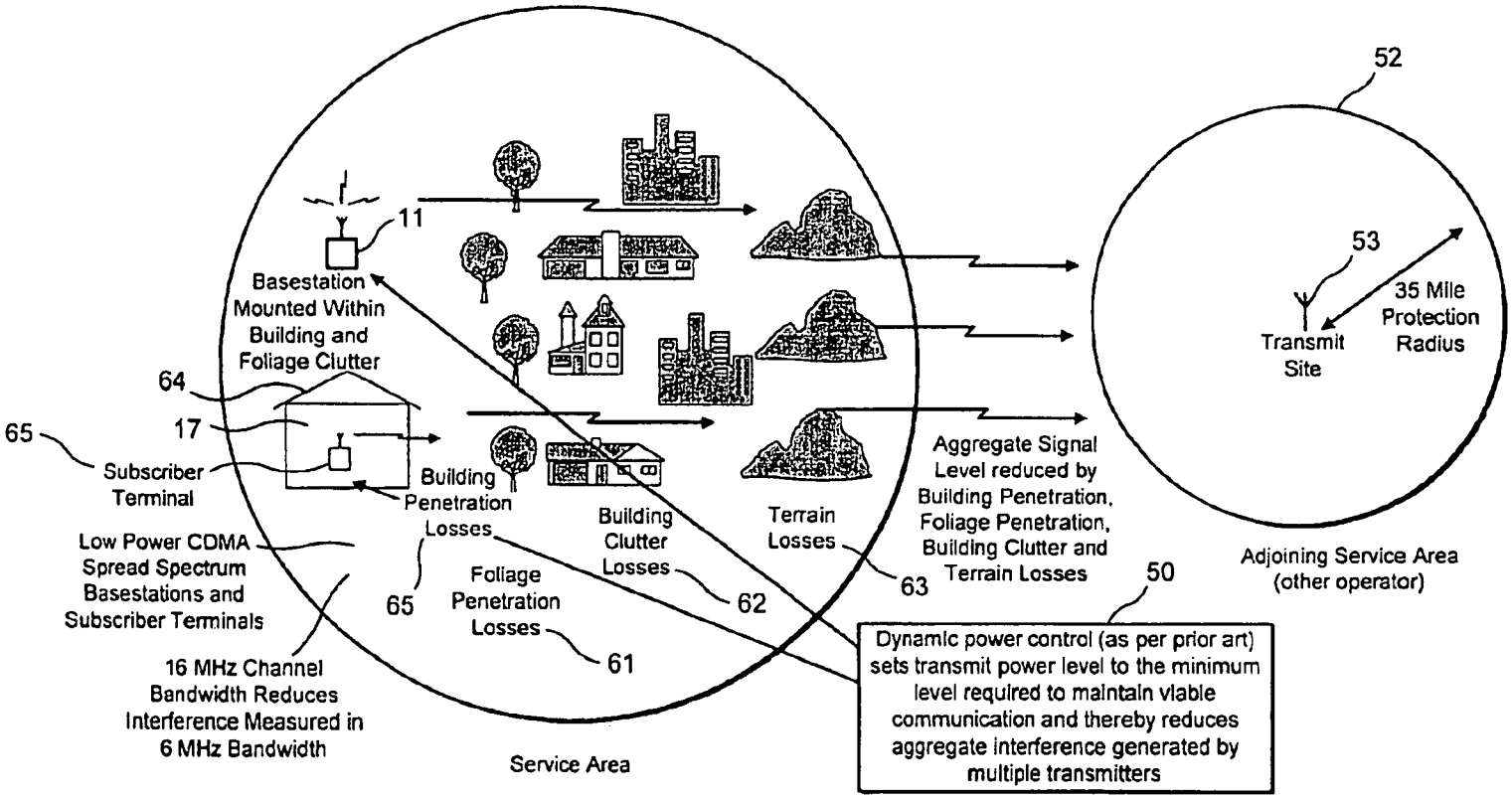
FIG. 6 is an illustration of interference avoidance by the specific mounting of base stations and is based on FIG. 5.

Now referring to FIG. 6, this illustrates the reduction of signal due to foliage penetration losses 61, that is, trees, etc., building penetration losses 65, building clutter losses 62 and terrain losses 63.

Figure 7:
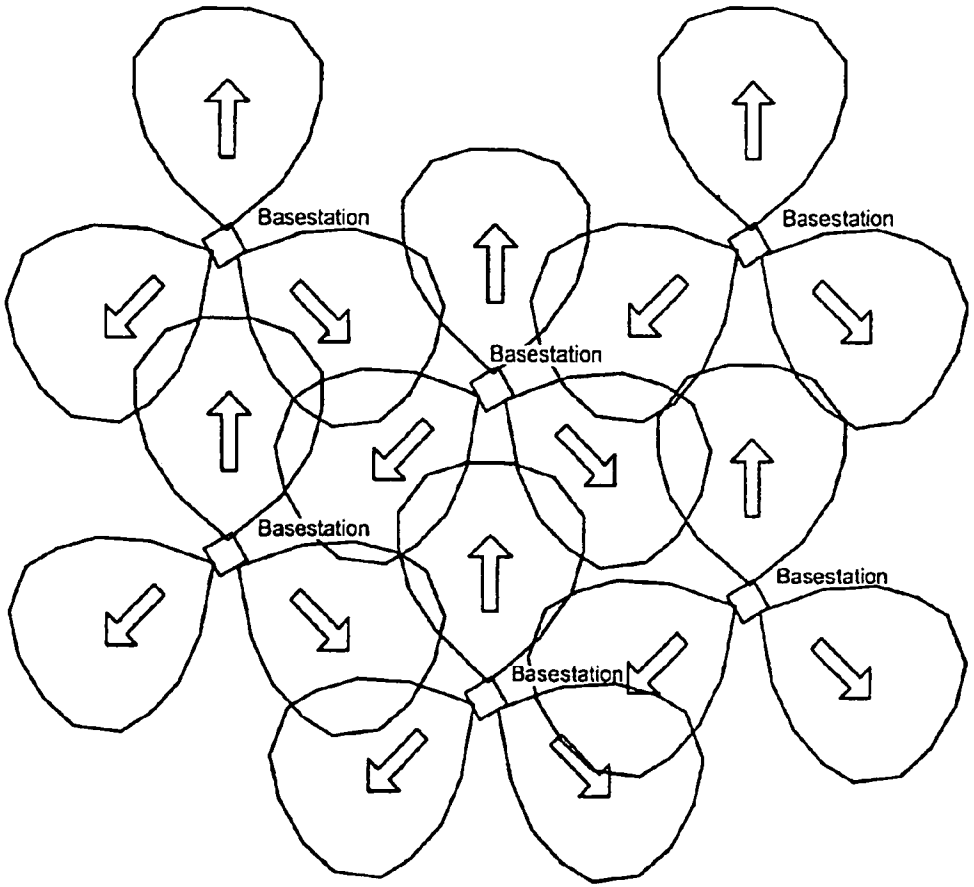
FIG. 7 is a prior art cellular coverage pattern.
Figure 8:
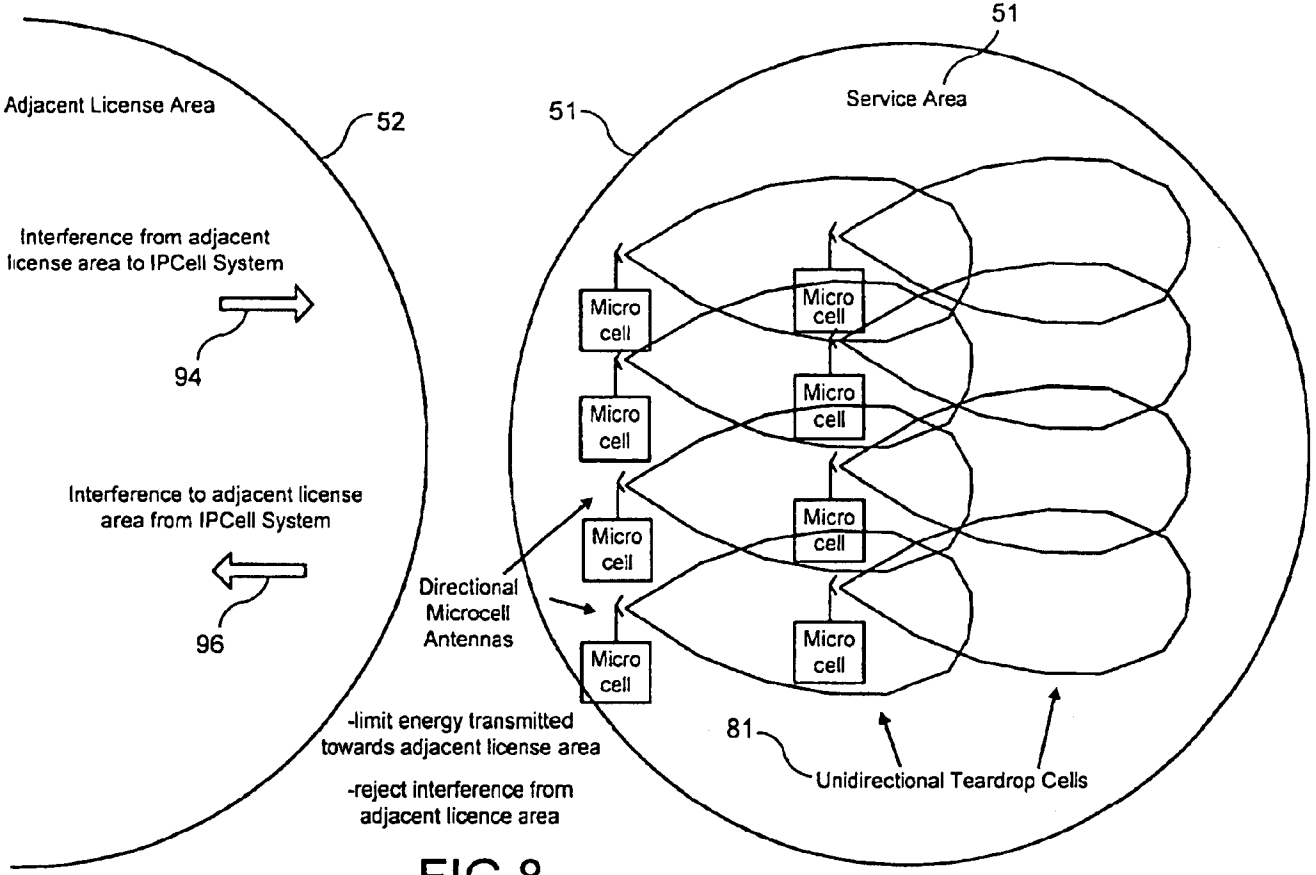
FIG. 8 is a variation of FIG. 5 illustrating interference reduction a coverage pattern achieved using directional antennas.

In situations where interference needs to be reduced further (to be discussed below), directional antennas are used at cellular base stations all pointing in directions away from the adjacent service area but with an overlapping pattern. Referring to FIG. 7, in the prior art the typical coverage pattern of a network of sectored cell sites was a repetitive "cloverleaf" pattern. If this pattern were to be applied to the situation in the MMDS bands (as per FIG. 5), some directional sector antennas would be pointing towards adjacent/nearby license areas and causing/suffering interference as a result. Referring to FIG. 8, the present system provides coverage of the target market 51 using an overlapping pattern of "unidirectional teardrop" antenna patterns 81 of multiple base stations. The unidirectional teardrop patterns are oriented away from the source/recipient of interference in the adjacent license area 52. This technique may also be used to reduce interference between adjacent/nearby cells operating on the same frequency.

Thus, in summary, with the subscriber terminal or user equipment designed for low power, that is less than 250 milliwatts in 6 MHz, this facilitates compliance with the FCC regulations to thus avoid the requirement that exact location of users be recorded and notified, while still providing effective coverage allowing for building penetration, clutter, foliage and other attenuation of the signal. This also removes the need for professional installation of subscriber equipment and avoids the requirement that directional antennas be used. Also, as will be described below, the present system is designed to operate with varying channel bandwidths which may vary for example from 6 MHz, to 12 MHz to 18 MHz and to 24 MHz Due to the proportionate increase in power permitted when using the broader bandwidth channels (2 times, 3 times and 4 times with respect to the 6 MHz bandwidth system) the invention complies with FCC regulations in all cases.

Referring back to FIG. 6 that illustrates the reduction of signal due to foliage penetration losses 61, building clutter losses 62, and terrain losses 63, a subscriber terminal 17 is illustrated as being contained within the building 64. The base stations 11 are designed to be mounted on utility poles or buildings that are within the building and foliage clutter. Thus, they may be mounted in small, unobtrusive enclosures with integral omni-directional or directional antennas. Standard household power is obtained from the utility pole or building either on a metered or unmetered basis depending on utility requirements. This is facilitated by Node B low power consumption as a result of the use of spread spectrum transmission techniques.

Inference avoidance is also provided, if necessary, by dynamic power control 50. By techniques already known the transmit power levels of both base stations 11 and subscriber terminals 17 may be set to the minimum level required to maintain viable communication.

The total amount of spectrum available to an operator of wireless Internet access services in the MMDS band may be limited to only a few 6 MHz channels (for example 4 channels). The technology must therefore be capable of providing high data and subscriber capacity in such a small amount of spectrum.

Unlike the normal cellular band, an MMDS licensee does not necessarily have a large contiguous block of channels. MMDS channels are allocated to licensees as individual channels of 6 MHz bandwidth, or blocks of several non-contiguous channels, usually spaced two channels apart (every second channel).

Thus, an MMDS licensee does not necessarily have "paired" blocks of frequency separated by a predetermined and fixed spacing, with one block for transmit (such as from a base station) and one block for receive. Therefore, an operator providing high-speed wireless Internet access services in the MMDS bands may need to operate in both a small total amount of spectrum, and with a small number of 6 MHz channels (contiguous or non-contiguous).

Figure 9:
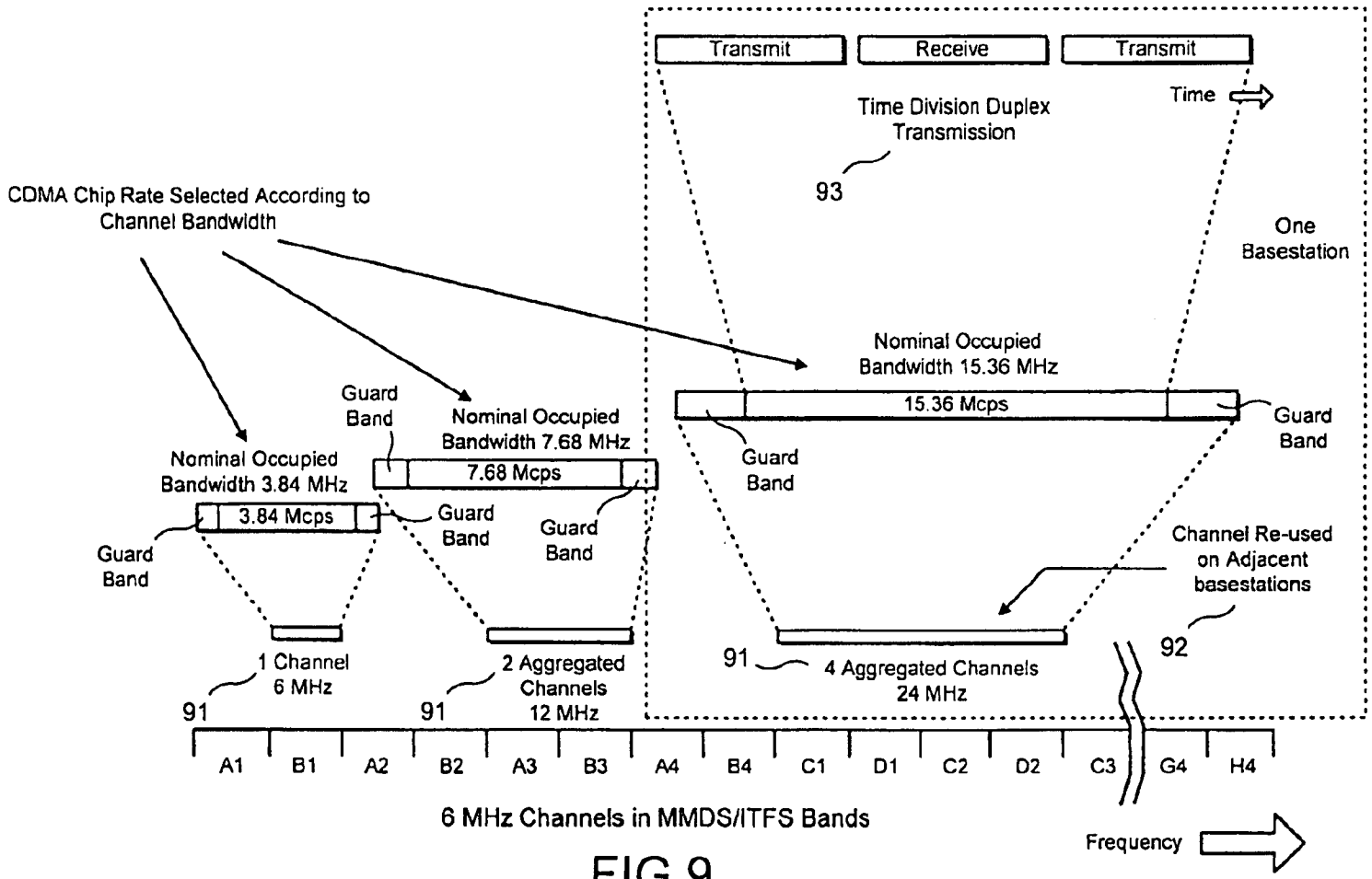
FIG. 9 is a frequency utilization diagram.

Referring to FIG. 9, the present technology is designed to allow such operation using the following techniques:

1. The UMTS CDMA radio technology is designed to operate in channels of 6 MHz, 12 MHz, 18 MHz and 24 MHz bandwidth 91, these being multiples of the standard 6 MHz MMDS/ITFS channels. The base station and associated User Equipment is able to support "chip" rates (wideband spread spectrum transmitted bit-rates) after spreading of 3.84, 7.68 and 15.36 Mchips/sec (Mcps), and the appropriate rate is selected according to the channel bandwidth available.
2. The system is designed to allow universal frequency reuse for adjacent base stations, such that a channel (6 MHz, 12 MHz, 18 MHz or 24 Hz bandwidth) can be reused (92) on every base station radio in a network serving a given geographic area (including on every sector of a sectored base station). Universal frequency reuse enables the systems to provide high subscriber capacity in a limited amount of spectrum (such as a single 24 MHz channel). The system achieves this through the nature of the spread spectrum CDMA technology, and the use of "Macro-diversity."
3. The system uses "time-division-duplex" (TDD) transmission 93. In contrast to traditional "frequency division" duplex (FDD) which uses separate sets of frequencies for transmit and receive, TDD allows the system to operate in any channel (or block of up to 4 contiguous channels) anywhere in the MMDS band. TDD is where transmit and receive occur on the same channel/frequency but in alternate or separate time intervals. This allows the present system to operate in a single 6 MHz, 12 MHz, 18 MHz and 24 MHz channel, unlike conventional cellular wireless systems which use FDD and require the acquisition of two separate channels, spaced apart in frequency to prevent a transmitter interfering with its co-located receiver.

In a wireless system, coverage (radius of a cell) and the data rates provided to customers usually have to be traded off against one another. The present system is required to provide data rates of "T1" speeds (1.5 Mbps) and up to 6 Mbps, and to provide coverage up to a maximum of 21 miles from a base station. A major factor in the tradeoff is the "delay spread" (see FIG. 17) which increases with the distance of the subscriber from the base station when operating in the multipath signal environment that is characteristic of a radio system that is designed for in-building coverage and simple user installability. If the delay spread time is approximately greater than a tenth of the time period of each symbol of transmitted information, then corruption of the transmission occurs.

Figure 10:
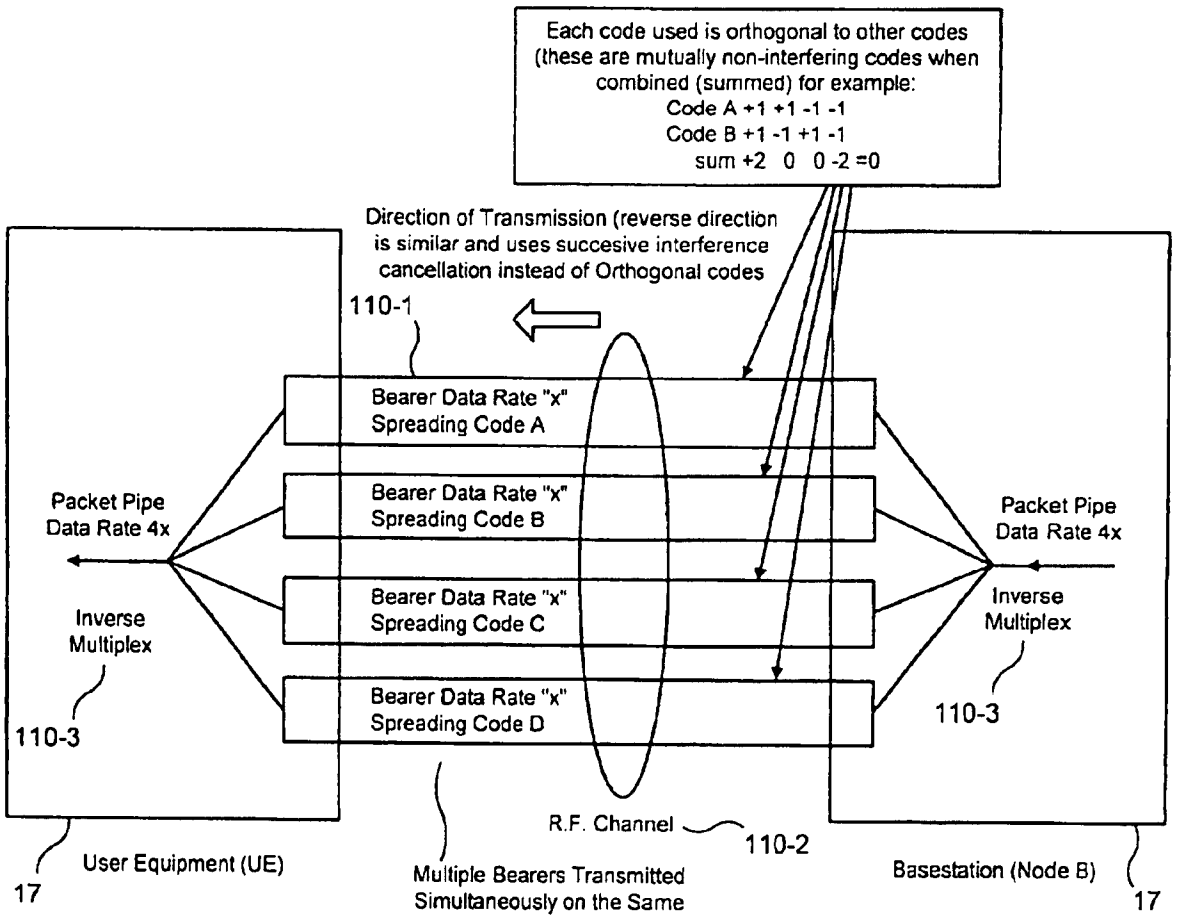
FIG. 10 is a multiple bearer transmission diagram.

Referring to FIG. 10, the present system solves this problem by:

1. Transmitting for example 4 "bearers" 110-1 simultaneously on the same RF channel 110-2, separated by different CDMA spreading codes. Each bearer in this example is ¼ of the data rate required by users. By using a lower data rate, the symbol period for each bit (time to transmit or receive one bit) is increased, allowing for greater delay spread (and therefore greater distance) before bits delayed by multipath arrive during the symbol periods of later bits, causing corruption of data. Orthogonal spreading codes are used on such bearers to minimize interference between them and maximize system gain.
2. The 4 bearers are aggregated or "inverse multiplexed" 110-3 by interleaving of bits to and from each bearer at both the base station and the User Equipment to provide aggregate user data rates of 4 times the bearer rate, (for example 4×384 kbps bearers are aggregated to provide a user data rate of 1.536 Mbps).
3. Implementation of Interference Cancellation (see FIG. 18) in the receiver of the base station to provide similar system gain on the uplink as achieved by orthogonal codes on the downlink to increase data transmission capacity and cell radius under loaded conditions, as described below.

The present system is required to provide maximum cell coverage (up to 1.5 miles radius in a typical suburban environment) taking into account a non line-of-sight radio path and building penetration to a indoor subscriber terminal with a directly-attached omni-directional antenna, and moreover to meet these requirements with the same data transmission rates in both the downlink and uplink directions.

In the prior art of CDMA wireless systems, the spreading codes that are transmitted in the downlink (base station to subscriber equipment) are orthogonal, that is, the pattern of each code is selected such that their interference relative to each other is zero. This is then degraded by multipath and implementation issues. However, in the prior art, the codes utilized in the uplink (subscriber unit to base station) tend to be uncorrelated rather than orthogonal, that is they appear as interference or noise to other users. This results in reduced capacity on the uplink and reduction in uplink cell radius as the cell is loaded, and in therefore precludes equal uplink and downlink data transmission rates for the same cell radius.

Figure 18:
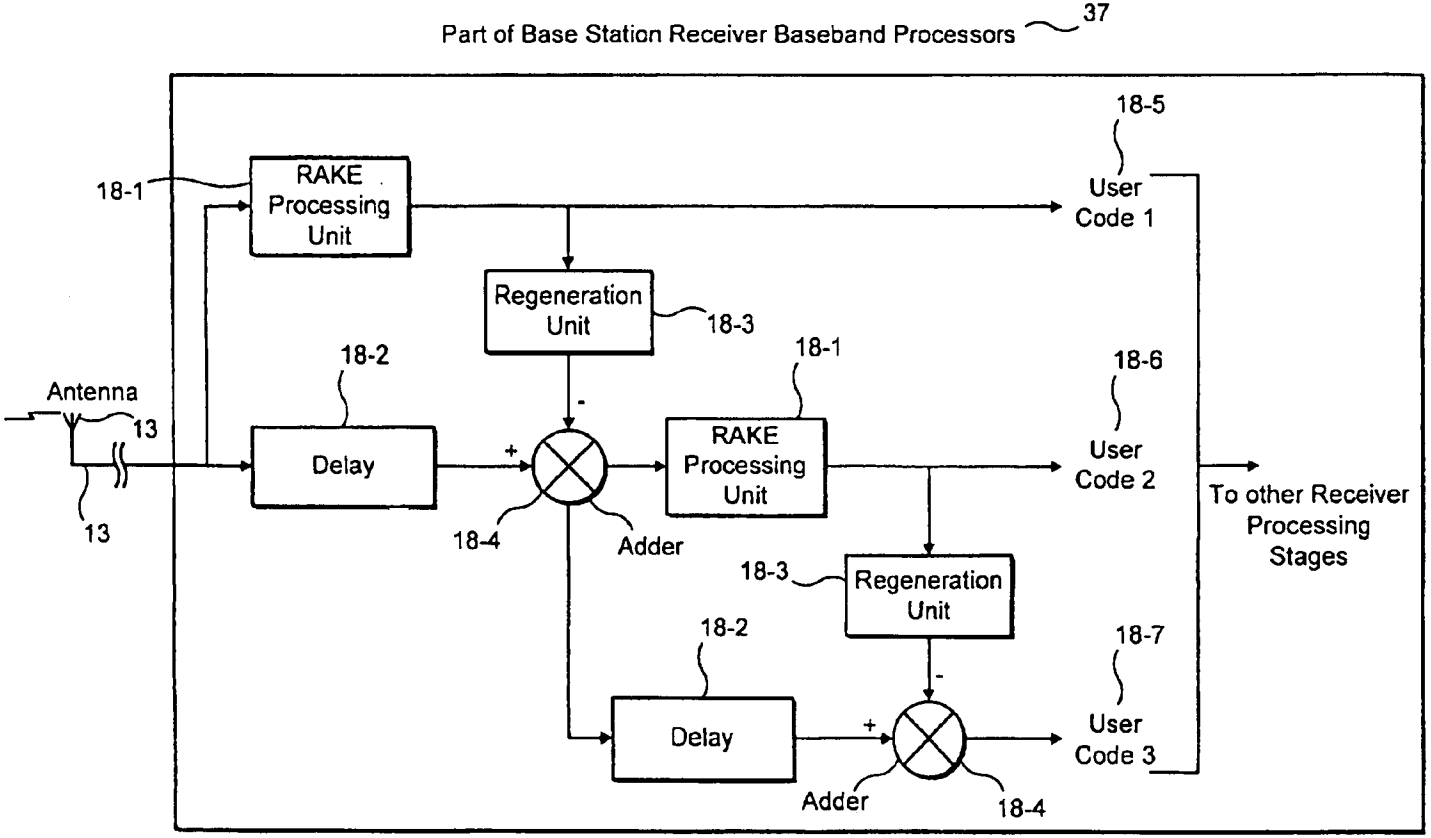
FIG. 18 is a diagram showing successive interference cancellation

In the present system, Successive Interference Cancellation (SIC) is used in the Base Station receiver to improve the performance of the uplink such that the same data rates can be supported as in the downlink for the same cell radius and equivalent other factors. SIC reduces the effect of interference between non-orthogonal codes, due to independent time offsets, in the uplink and as such can be viewed as having the same effect as that of orthogonal codes in the downlink. Referring to FIG. 18, the receiver 13 receives all the simultaneously transmitted user codes 1, 2 and 3 etc. The received codes are all ranked from highest to lowest with respect to Signal to Interference (SIR). The Rake processing unit 18-1 selects the code with the highest SIR and processes that code. Once rake processed Code 1 is regenerated in the regeneration unit 18-3, the output is now equivalent to what was received in code 1 only, prior to rake processing. The incoming signal comprising all codes is also delayed in the delay unit 18-2, and the regenerated code 1 is then subtracted from the delayed input at the adder 184 producing an output to code 2's rake processor that does not include code 1, therefore the interference from code 1 with respect to code 2 has been cancelled. This process is repeated for each code successively resulting in the full cancellation of own cell interference to the last code in the process. Because the codes were ranked with respect to SIR this process guarantees that the codes with the lowest SIR benefit the most from SIC.

To be able to serve a large mass market of Internet subscribers, it is very important to make the equipment easy to install by providing ubiquitous coverage and service inside of buildings, while avoiding the need for the installation of a rooftop antenna at the subscriber's premises. At the same time it is very important to provide high system capacity to ultimately have the capability to provide service to a high proportion of homes and businesses in a given geographic area.

Figure 11:
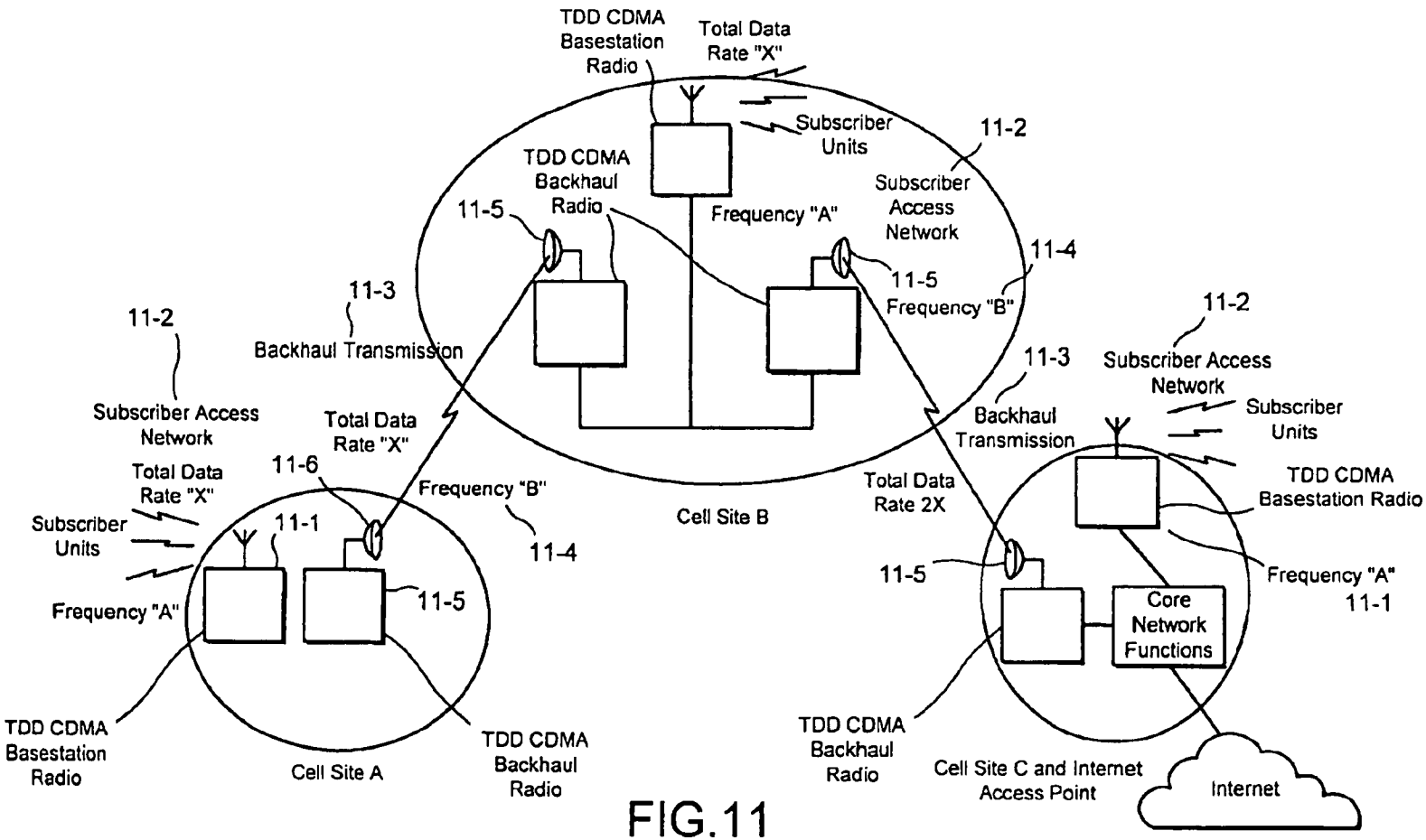
FIG. 11 is a schematic illustrating backhaul transmission.

Referring to FIG. 11, the present system provides in-building coverage and high capacity simultaneously by:

1. Use of a radio transmission technique (Wideband CDMA modulation and Rake Receivers) capable of operating with multipath signals (direct and reflected signals following different paths and arriving at slightly different times);
2. Covering the service area with a number of radio cells of small diameter to reduce signal losses, thus allowing more signal margin to penetrate inside buildings;
3. Location of microcell base stations at approximately rooftop level to increase the building penetration of the signal (building penetration can be maximized by the signal-arriving horizontally);
4. Use of macro-diversity, where a building is served simultaneously on the same frequency by two or more cells, from different directions. Macro-diversity increases the probability of reliable coverage at any point within the building.
5. Multiple bearer transmission as described above and in FIG. 10.
6. Interference Cancellation in the receiver of the base station as described-above and in FIG. 18.

Figure 12:
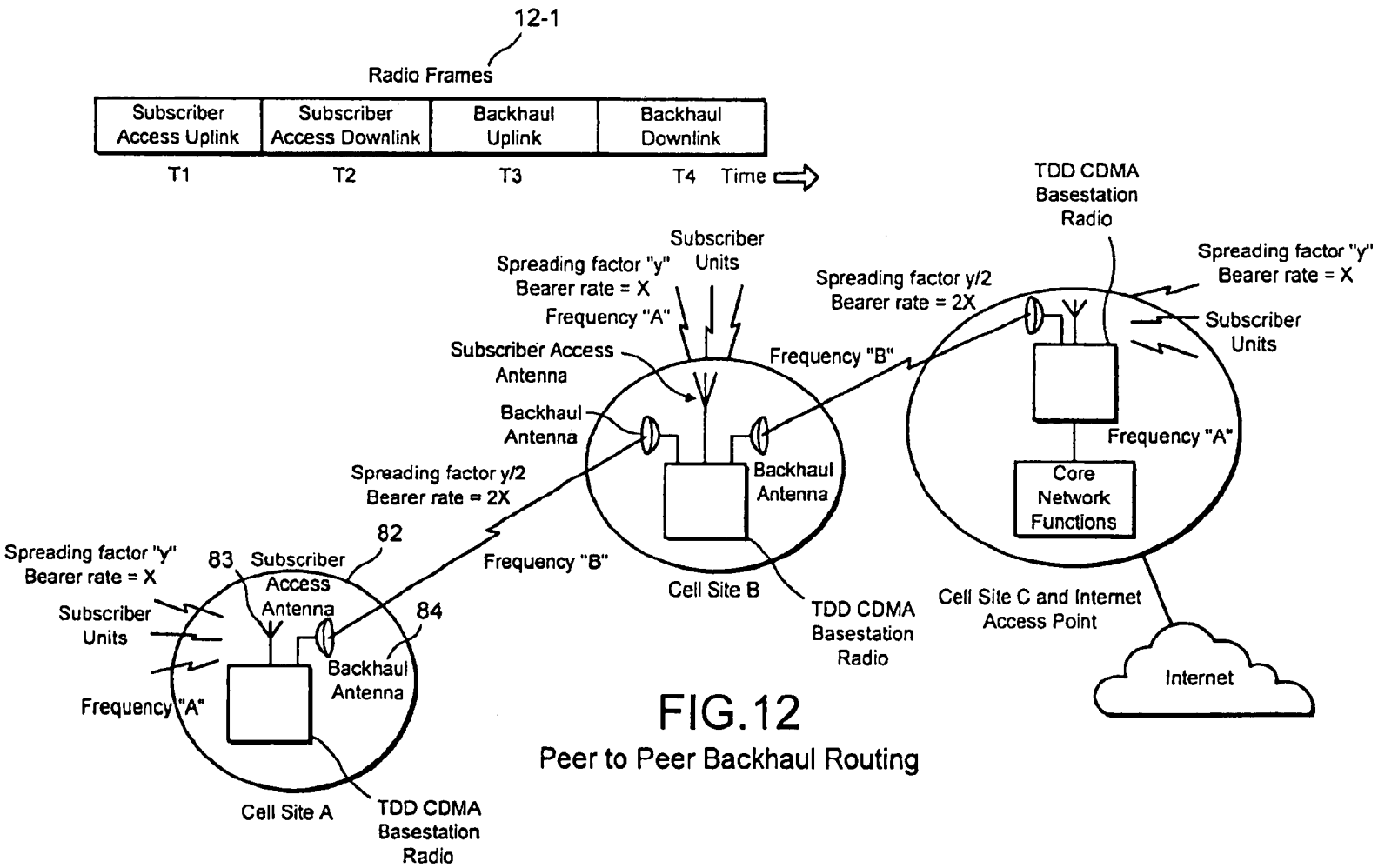
FIG. 12 is a schematic illustrating backhaul transmission of another type.

A system with a large number of cells (i.e. micro cells) can result in a high cost for so-called "backhaul" transmission equipment. Backhaul is a term in the wireless and cellular telephone art whereby voice or data that is transmitted from the base station to/from the central office switch or core network equipment, which is normally carried by a line-of-sight microwave radio or landline link. And then of course the core network equipment must in turn transmit this information to the public switched telephone network, or to the Internet or Intranets in the context of the present system. Such backhaul is a major component of system cost, especially as the volume of data is increased in a high speed Internet access system. FIGS. 11 and 12 illustrate two different techniques of backhaul transmission, both of which use a type of routing through adjacent base stations finally to one of the base stations locations which incorporates core network functions and provides access to the Internet. These techniques reduce the cost of backhaul and facilitate rapid deployment.

FIG. 11 illustrates a system where each cell site designated A, B and C has both a base station radio 11-1 dedicated to a subscriber access network 11-2 (that is, communication with a user or subscriber terminal) and a separate backhaul radio 11-5 with a directional antenna with a path being indicated as 11-4 to a similar backhaul radio, for example from cell site A to cell site B. By using two separate radio transmission and receiver units, that is 11-1 and 11-5 of the same design type at each base station, this simplifies and lowers cost and installation time. At the same time, the backhaul radios 11-5 include the associated directional antennas, 11-6. Specifically in FIG. 11, cell site A for its backhaul transmits and receives to cell site C via the intermediate station cell site B. Cell site C connects the core network functions and thence to the Internet. Line of sight is not required for the backhaul links. The backhaul transmission operates in the same 2.5-2.68 GHz band but on a different channel frequency 11-4 as compared to the subscriber access network. Thus, additional radio spectrum outside of the normal MMDS band is not required. The links 11-4 may be operated at a higher bearer data rate due to the superior radio channel conditions including reduced delay spread and greater signal strength created by the use of directional antennas which allows the use of a lower spreading factor or channel coding, resulting in, for example, twice the throughput bit rate compared to the subscriber access network.

FIG. 12 illustrates peer-to-peer backhaul routing, for example, from cell site A to adjacent cell site B, to cell site C which connects to the core network functions and thence to the Internet, with the use of a common base station radio transmitter and receiver. That is the same radio resource at a base station is used for both subscriber access and peer-to-peer backhaul. Here the allocation of resources as shown by radio frame diagram 12-1, is by a time division method, which allocates radio frames in the time domain on the radio resource between the subscriber access using the omni directional antenna 83 and the backhaul using the directional antenna 84. Thus, as illustrated by the frame timing diagram 12-1, cell site A may transmit and receive traffic with its subscribers in the uplink and downlink radio frames T1 and T2 using the omnidirectional antenna and in radio frames T3 and T4 it switches to the directional antenna 84 aimed toward cell site B (and vice versa) to transmit and receive backhaul traffic with cell site B using the backhaul uplink and downlink radio frames. An identical process occurs between cell site B and cell site C. Again, by the use of the directional radio path with reduced delay spread and greater signal strength, the spreading factor can be reduced, allowing a higher data rate.

Cellular wireless systems normally consist of a number of base stations connected to a centralized "core network" typically consisting of switches, base station controllers and related functions, analogous to a telephone company "central office". The negative consequences of this are:

1. The (relatively) high cost of the core network equipment makes it difficult to scale the system down to a small market (e.g. a small city), where the cost of such equipment must be spread over a relatively low number of subscribers.
2. All base stations served by a set of core network equipment must be connected by backhaul transmission typically to a single core network point serving the entire network. This is costly, and can be difficult logistically.
3. A centralized core network generally implies one connection point to the Internet.

The present system avoids these problems by the following techniques:

1. Distribution of the core network functions 12 in FIG. 4 across the network of base stations. Core network functions are provided for each group of 3 base stations (i.e. 3 single-channel micro cells or 3 sectors of a sectored cell site).
2. Providing for each group of 3 base stations (through the core network functions therein) to connect directly to the Internet. This enables the network of base stations to connect to multiple Internet "points-of-presence," and thereby reduces backhaul transmission costs and the logistics of providing backhaul.

Figure 13:
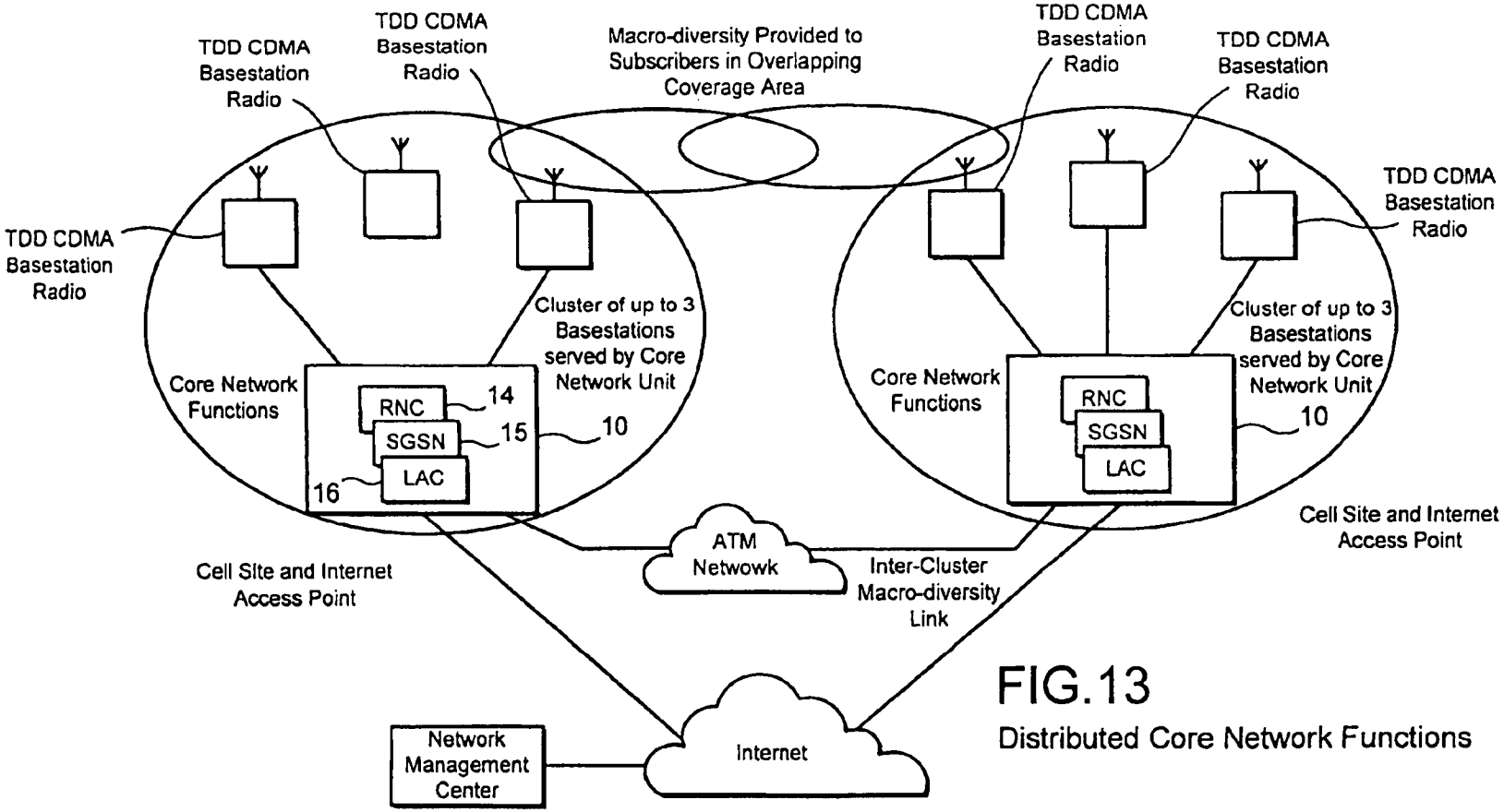
FIG. 13 is a diagram showing core network functions.

Referring to FIG. 13, a "Core Network Unit" (network controller) 10 is associated with a cluster of up to 3 base stations. These base stations may be either at 3 separate cell sites or 3 sectors of a single sectored cell site.

In addition, an ATM (asynchronous transfer mode) network connection is provided between core network functions controlling base stations with overlapping coverage 10 rather than via the Internet to ensure a constant latency (delay) in the transfer of time critical macro-diversity data which has been discussed briefly above.

In the deployment of the system embodying the present system, cost economies can be realized by using shared packet data channels of the highest possible speed (data rate) on a base station, regardless of the speed of service desired by the various subscribers served by that base station. It is then desirable to deliver different speeds of service to different customer types at different prices. This is referred to in the present system as "service tiering." When multiple users are sharing a single wideband channel, a service tier is defined as a rate in kilobits per second (kbps) approximately equivalent to a dedicated channel of the same speed, as perceived by the typical Internet user. For example, a 384 kbps tier (provided via a shared packet data channel of 1536 kbps) is perceived by the Internet user to be similar in speed to a dedicated channel of 384 kbps.

The approach is based on the difference between peak data rates (the actual speed of packet data transmission) and average data rates over a period of time. A typical Internet user perceives the average data rate over a period of time. For example, a typical Internet user (while engaged for example in Web browsing) is only sending or receiving data for 10% of the time. If that user is allocated 10% of the time of a 1536 kbps channel, he will perceive a data rate of approximately 1536 kbps. However, if he is allocated 5% of the time on the same channel, he will perceive a rate of half the channels speed, or 768 kbps. Tiering is thus achieved by the percentage of the time allocated on the channel to each user according to his tier of service.

The invention provides tiering by prioritization of packets according to the defined tier of service of the sending/receiving customer in the media access control protocol operating between the radio network controller 14 and the subscriber terminal 17 via the base station 11.

Figure 14:
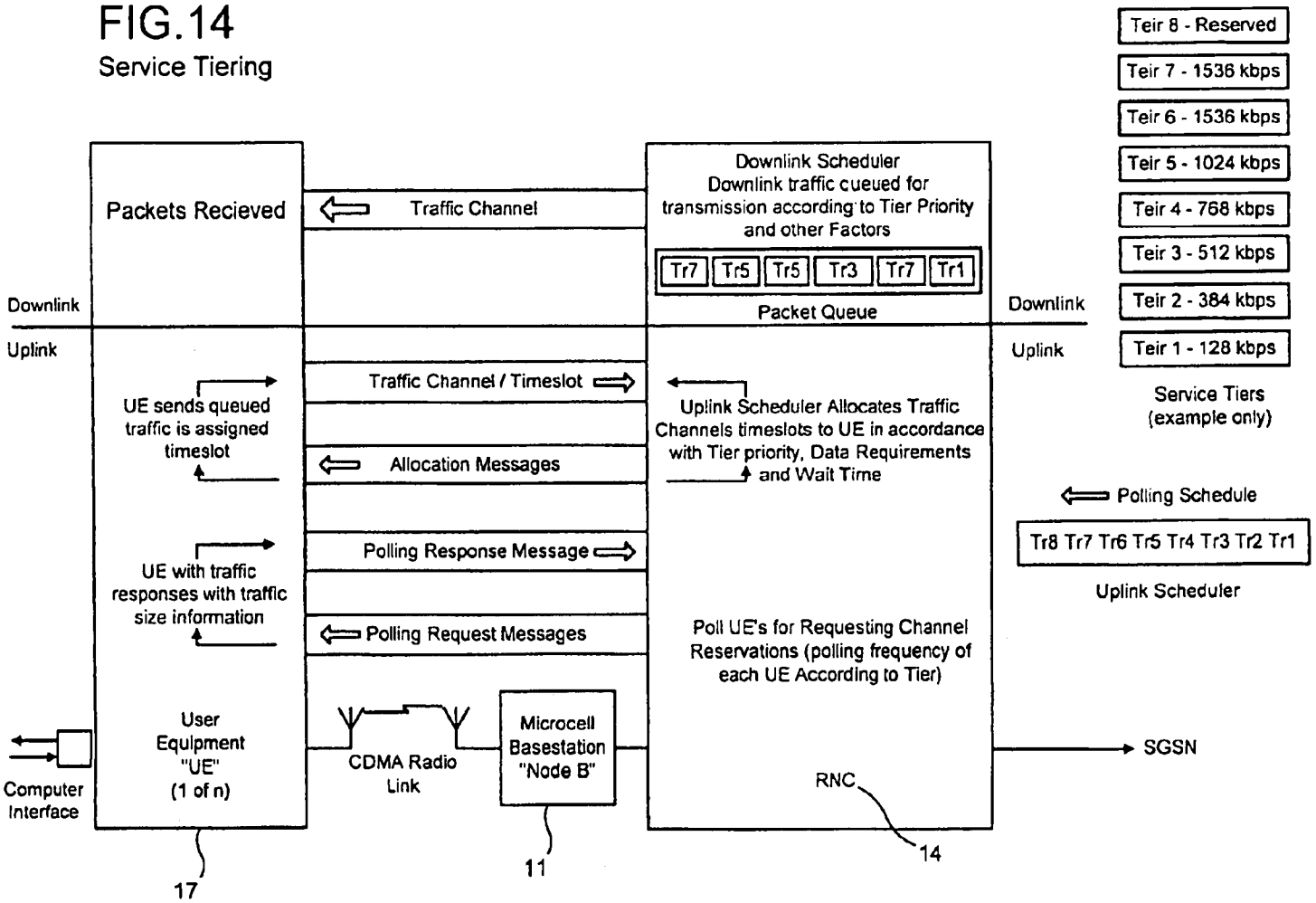
FIG. 14 is a block diagram showing service tiering.

Referring to FIG. 14, if a customer is using his computer to access the Internet, that computer is connected to the user equipment, the UE, and the traffic he wishes to send is buffered and queued in his user equipment waiting for resources on the radio network to be allocated. At the same time the radio network controller 14, the RNC, routinely sends a polling request message to all of the user equipment. The logical channels used to transmit this information are derived from a benefit obtained from Wideband CDMA where transmission of multiple logical data channels can operate simultaneously on the same radio channel using different spreading codes.

When the user equipment sees the Polling Request Message given that it has traffic queued to send, it will respond with a the polling response message with, firstly, the fact that it has information to send and, secondly, with how much data it wishes to send. That is received by the RNC, by its scheduler. The scheduler receives these requests from all of the user equipment and the role of the scheduler is to allocate time on a traffic channels via time slots in accordance with the amount of data each user equipment has to send and also in accordance with the tier priority assigned to that subscriber's user equipment. Additionally, its tier of service, providing further accuracy to the prioritization scheme, determines the polling frequency of each subscriber terminal.

The scheduler operates as follows for inbound traffic from subscriber terminals 17 to the Internet 27 via the base station 11 and core network functions 10: The request from user equipment from the subscribers with the highest tiers of service, for example, tier 8 will get priority so the request will go towards the front of the scheduler queue. Another factor taken into account in the scheduler is how long a request from a user's equipment has been waiting to be serviced. After the scheduler has determined the schedule, it sends out information in an allocation message to the user equipment which tells each of them what time slots on the traffic channels they are being assigned to transmit their information and the user equipment on receiving it sends its traffic on the allotted time slot. In the reverse direction outbound traffic from the Internet 27 to the subscriber terminal 17 is queued for transmission in the radio network controller 4. The downlink scheduler in the radio network controller 14 prioritizes traffic in its packet queue for transmission in accordance with the tier of service of the destination subscriber terminal 17, the amount of data and the time a packet has been waiting in the queue. An allocation message is sent to the user equipment by the scheduler in the radio network controller 14 to indicate the allocation of timeslots on the downlink.

In summary, the overall purpose of the tiering is that with merely one radio resource at the base station and one channel in each direction which has a maximum speed of for example 3 Mbps, a tier 2 subscriber for example may easily be accommodated who has a 384 kbps service. However, data is actually being sent and received to that subscriber at the full speed of 3 Mbps which is the actual net burst rate that is being transmitted. But by allocating only a limited proportion of the time on the channel, that subscriber has the appearance of the average speed of approximately 384 kbps.

In a conventional time-division-duplex system, alternate timeslots are allocated to each direction of transmission. This is not the optimum when the system is used for applications such as Internet access, where the data traffic is asymmetric, or where peer-to-peer routing of backhaul traffic between base stations is required.

The present system uses "enhanced time-division duplex (TDD) to solve these problems:

1. The system is designed to typically provide a total of 15 timeslots per radio frame between the base station and the subscriber terminals. Two of these are for signaling and the remaining 13 for base station-subscribers downlink and subscribers-base station uplink. Backhaul is supported by the allocation of radio frames for this function, in fact stealing them from the CDMA air interface. The overall time allocation ratio between the three (CDMA downlink, CDMA uplink and backhaul) can be set according to the traffic asymmetry and the backhaul requirement.
2. In timeslots used for backhaul, higher transmission rates may be used (with less coding or spreading), taking advantage of the use of directional antennas between base stations.

Figure 15:
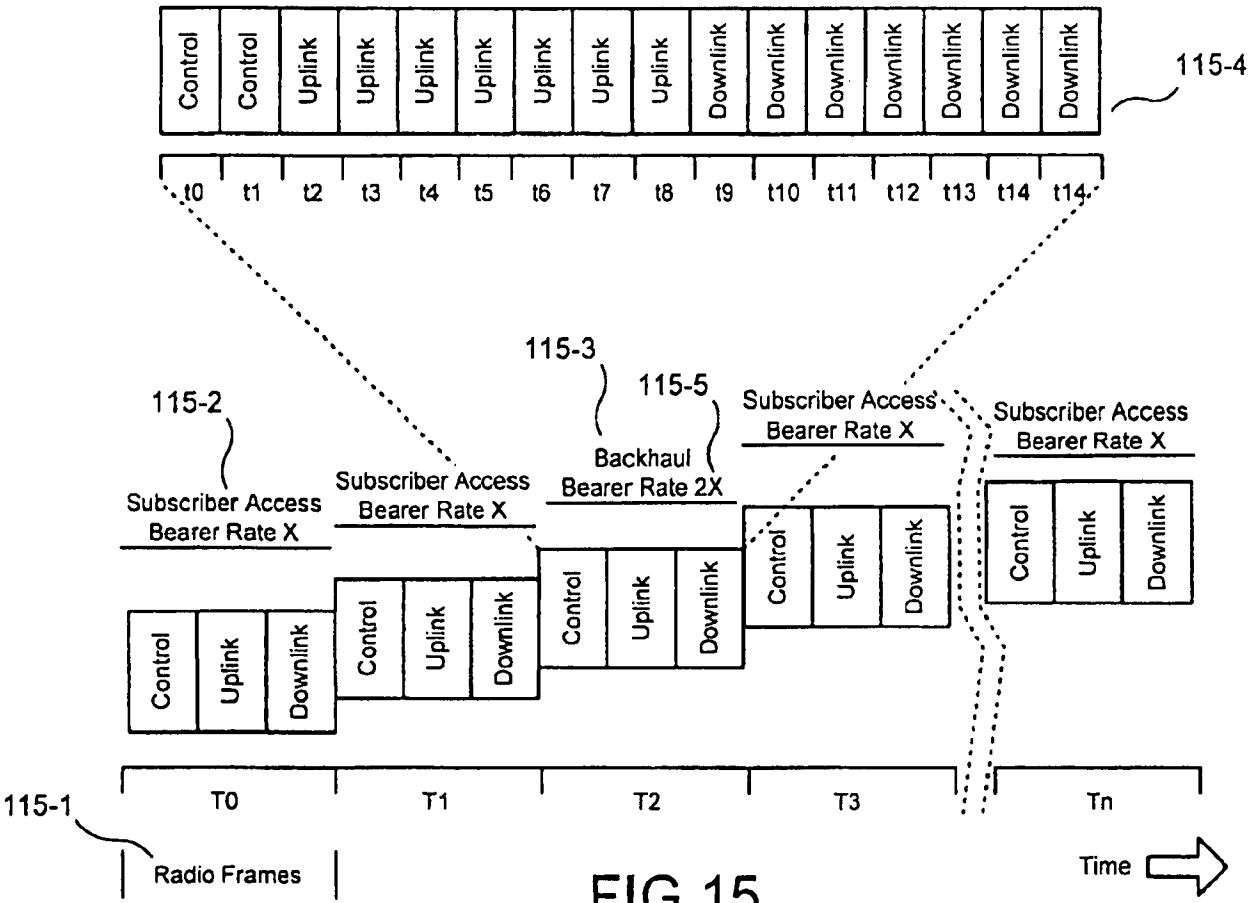
FIG. 15 is a timing diagram and an illustration of Internet packets showing a time division duplex feature of the present invention.

Referring to FIG. 15, the first level of time division ("T") is between radio frames 115-1. Frames are allocated either to subscriber access (base station to UE) 115-2 or to peer-to-peer backhaul between base stations 115-3. A higher transmission rate 115-5 is used on radio frames allocated to backhaul, allowing each backhaul radio frame to carry the volume of traffic to/from two consecutive subscriber access radio frames.

The second level of time division is within each radio frame 115-4, which is divided into 15 timeslots. Timeslots 0 and 1 are reserved for common control/signaling purposes. The remaining 13 timeslots can be allocated to uplink and downlink traffic on any ratio. For example, for typical asymmetric Web browsing traffic the ratio could be 3 slots uplink and 11 slots downlink. The ratio can be changed over time to reflect changing traffic patterns.

In the prior art, the data rate transmitted in a digital cellular wireless system is determined by the worst case position of a subscriber in the coverage area of a cell and other worst case radio channel parameters. However, subscribers close in to the base station (typically around 30%-50% of subscribers) would be able to transmit and receive at a higher data rate if the system could determine the channel conditions to and from each subscriber unit and set transmission speeds accordingly.

The present system solves this problem by allowing the transmission rate to be selected for each subscriber unit according to the channel conditions applicable to such subscriber unit both in the uplink and downlink directions. This technique is called rate adaption, and is made possible by the use of direct sequence spread spectrum transmission and the use of time-division-duplex.

Figure 17:
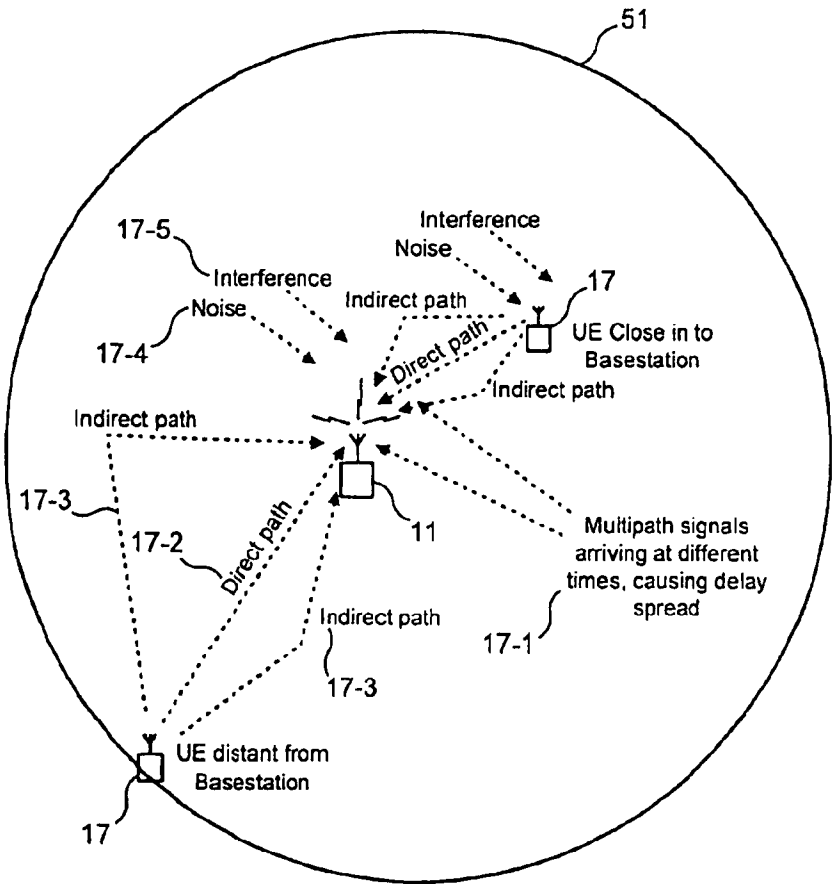
FIG. 17 is a diagram showing delay spread caused by multipath signals

By using direct sequence spread spectrum transmission in which the user data rate (D) can be varied by changing the spreading factor (SF) within a fixed transmitted chip rate (C) on the air interface according to the formula $C=D\times SF$. Thus for example the user data rate can be doubled by halving the spreading factor. Referring to FIG. 17 the usable spreading factor for the radio path to and from the base station 11 to each subscriber terminal 17 is determined by the delay spread on the signal caused by multipath propagation 17-1 resulting from the combination of a direct path signal 17-2 and indirect path signals 17-3 at the receiver and by the ratio of the wanted signal at the receiver to the combined noise 17-4 and interference 17-5 present.

Figure 16:
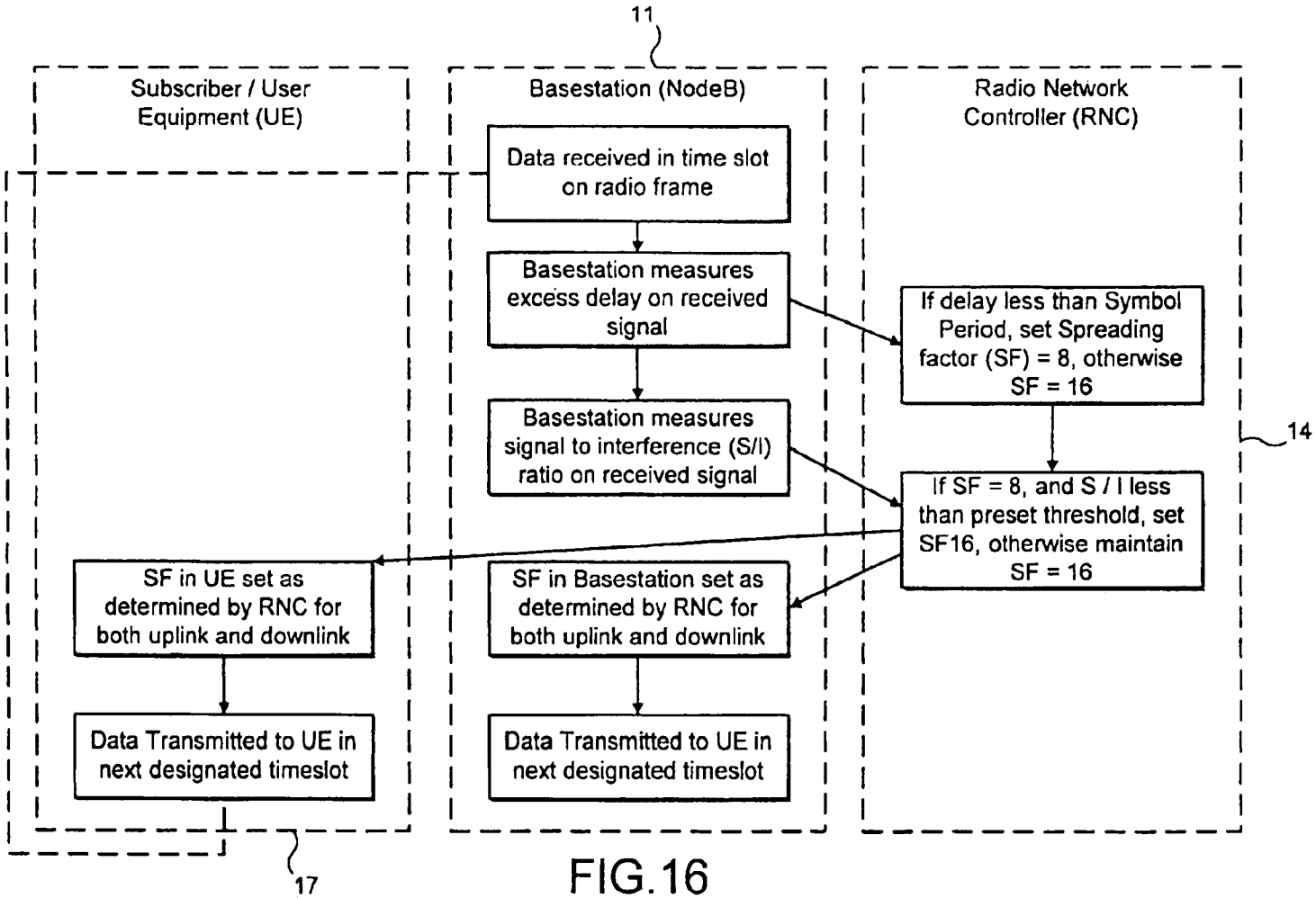
FIG. 16 is a flowchart of channel measurement used in transmission rate adaption.

By using time-division-duplex transmission, the multipath and other characteristics of the radio channel in both the uplink (subscriber terminal to base station) and downlink (base station to subscriber terminal) are identical, allowing the base station to measure the channel characteristics at its receiver and set the transmission data rates for both uplink and downlink transmissions. Referring to FIG. 16, for transmission from each subscriber terminal the base station measures excess delay spread caused by multipath and reports this information to the radio network controller which sets the spreading factor and therefore the user data rate to be used on subsequent transmissions in both the uplink and downlink directions according to the relationship between the excess delay spread time and the symbol period of each transmitted bit of data For example, if the excess delay is below a set threshold value a spreading factor of 8 is set for that particular user equipment resulting in twice the transmitted bit rate, otherwise a spreading factor of 16 is indicated. The base station also measures the ratio of wanted signal to noise plus interference and reports the resulting signal to interference figure (S/I) to the radio network controller which compares this with a predetermined threshold. If the ratio is below the threshold and a spreading factor of 8 is indicated by excess delay measurement as described above, the spreading factor will be increased to 16 and the user data rate reduced according to permit more reliable communication. A flowchart demonstrating this process is show in FIG. 16.

The radio network controller signals the spreading factor determined by such measurement in respect to a particular subscriber terminal to both the base station and that subscriber terminal, which spreading factor is then used for subsequent transmissions to and from such subscriber terminal until such time as the radio network controller determines new parameters.

Thus, an improved cellular Wireless Internet Access System has been provided.

What is claimed is:

[1. A cellular wireless internet access system comprising:

a plurality of portable subscriber terminals each having a directly attached antenna for communicating in a predetermined frequency band with a predetermined nearby cellular base station;

a plurality of cellular base stations each transmitting and receiving in said predetermined frequency band at a single frequency with a predetermined said plurality of said subscriber terminals; and means for operating said base station on a small frequency allocation obtainable anywhere within the designated frequency band using a single frequency channel of varying bandwidth between 6 and 24 MHz using different spread spectrum transmission chip rates; and means for operating said base station in a time-division-duplex mode to enable said transmitting and receiving at said single frequency channel thus avoiding the need for separate channels spaced apart for transmit and receive and including means for allocating the ratio of time for transmitting and receiving on a predetermined basis said time division as a function of expected traffic demand;

means for providing high net data rates of 1.5-3.0 Mbps using a plurality of data bearer subchannels on said single frequency channel, orthogonal downlink spreading codes for CDMA transmission, and successive interference cancellation or simultaneous uplink spreading codes.]

[2. A system as in claim 1 where each band is divided in the time domain into frames and each frame has a predetermined number of time slots allocated to control, uplink, and downlink communications between said cellular base stations and subscriber terminals.]

[3. A system as in claim 2 where some of said frames are dedicated to backhaul communication between base stations on a peer-to-peer basis.]

[4. A system as in claim 2 where the data transmission rate is increased during time domain frames used for backhaul communication by switching to directional antennas during these timeslots thus providing an improved radio channel quality to support such increased data rate.]

[5. A system as in claim 1 where said means for using different transmission chip rates provides net data rates of 1.5-3.0 Mbps on said small frequency allocation.]

*6. A cellular wireless base station, comprising:*

*a transmitter and a receiver for communicating with at least one portable subscriber terminal; and*

*a processor for providing a baseband signal, the baseband signal comprising a plurality of data bearing sub channels and representing a wireless RF signal for transmission by the transmitter in a time-division mode on a single frequency channel, the processor further comprising a bandwidth selector configured to select a radio bandwidth of the single frequency channel, based upon an integer multiple of a first bandwidth, wherein the radio bandwidth selected has a width of the first bandwidth or an integer multiple of the first bandwidth; wherein:*

*the processor is further operable to inverse multiplex the baseband signal into multiple downlink data bearing signals, and*

*the transmitter is operable to transmit the multiple downlink data bearing signals simultaneously on the single frequency channel in the time-division mode at individual data rates that combine to an aggregate data rate.*

*7. The base station of claim 6, wherein the first bandwidth is no greater than about 6 MHz.*

*8. The base station of claim 7, wherein the radio bandwidth is selectable from a group consisting of 6, 12, 18 and 24 MHz.*

*9. The base station of claim 8, wherein the baseband signal has a net data rate in a range of 1.5-6.0 Mbps.*

*10. The base station of claim 6, wherein the transmitted signal conforms to the UMTS standard and the single frequency channel is a microwave frequency.*

*11. The base station of claim 6, wherein the receiver is operable to apply interference cancellation to uplink data bearing signals received by the receiver.*

*12. The base station of claim 6, wherein the base station resides in a first service area adjoining a second service area, and, at a predefined boundary between the first service area and second service area, an aggregate signal level on the frequency channel transmitted from the first service area is below a predetermined threshold.*

*13. The base station of claim 12, wherein the predetermined threshold is −65 dB relative to a level of a signal that is transmitted by a base station in the second service area within the frequency channel and measured 35 miles from the base station in the second service area.*

*14. The base station of claim 6, wherein the base station resides in a first service area adjoining a second service area, and an aggregate signal level transmitted from the first service area relative to a signal transmitted on an adjacent channel in the first or second service area is below a predetermined threshold.*

*15. The base station of claim 14, wherein the predetermined threshold is 0 dB.*

*16. The method of claim 6, wherein the bandwidth selector is configured to select the radio bandwidth of the single frequency channel for the communicating with the at least one subscriber terminal via both the transmitter and the receiver.*

*17. A method for communicating over a cellular wireless network, the method comprising, at a base station:*

*selecting a radio bandwidth of a single frequency channel based upon an integer multiple of a first bandwidth, wherein the radio bandwidth selected has a width of the first bandwidth or has a width that is an aggregation of multiples of the width; and*

*communicating on the single frequency channel with at least one portable subscriber terminal using a signal comprising a plurality of data bearing sub channels in a time-division mode, wherein the communicating comprises:*

*inverse multiplexing the signal into multiple downlink data bearing signals; and*

*transmitting the multiple downlink data bearing signals simultaneously in the sub channels at individual data rates that combine to an aggregate data rate.*

*18. The method of claim 17, wherein the first bandwidth is no greater than about 6 MHz.*

*19. The method of claim 18, wherein the radio bandwidth is selectable from a group consisting of 6, 12, 18 and 24 MHz.*

*20. The method of claim 19, wherein the signal has a net data rate in a range of 1.5-6.0 Mbps.*

*21. The method of claim 17, wherein the signal conforms to the UMTS standard.*

*22. The method of claim 17, further comprising applying interference cancellation to uplink data bearing signals received by the receiver.*

*23. The method of claim 17, wherein the base station resides in a first service area adjoining a second service area, and, at a predefined boundary between the first service area and the second service area, an aggregate signal level on the frequency channel transmitted from the first service area is below a predetermined threshold.*

*24. The method of claim 23, wherein the predetermined threshold is −65 dB relative to a level of a signal that is transmitted by a base station in the second service area within the frequency channel and measured 35 miles from the base station in the second service area.*

*25. The method of claim 17, wherein the base station resides in a first service area adjoining a second service area, and an aggregate signal level transmitted from the first service area relative to a signal transmitted on an adjacent channel in the first or second service area is below a predetermined threshold.*

*26. The method of claim 25, wherein the predetermined threshold is 0 dB.*

*27. A portable user equipment (UE), comprising:*

*a transmitter and a receiver for communicating with at least one base station; and*

*a processor for receiving a baseband signal, the baseband signal comprising at least one data bearing sub channel and representing a wireless RF signal for transmission by the transmitter in a time-division mode on a single frequency channel, the processor further comprising a bandwidth selector configured to select a radio bandwidth of the single frequency channel based upon an integer multiple of a first bandwidth, wherein the radio bandwidth selected has a width of the first bandwidth or an integer multiple of the first bandwidth and wherein the processor is further operable to inverse multiplex the baseband signal into at least one uplink data bearing signal, and the transmitter is operable to transmit the at least one uplink data bearing signal simultaneously on the single frequency channel in the time-division mode using at least one data rate that combine to an aggregate data rate.*

*28. The UE of claim 27, wherein the first bandwidth is no greater than about 6 MHz.*

*29. The UE of claim 28, wherein the radio bandwidth is selectable from a group consisting of 6, 12, 18 and 24 MHz.*

*30. The UE of claim 29, wherein the baseband signal has a net data rate in a range of 1.5-6.0 Mbps.*

*31. The UE of claim 27, wherein the transmitted signal conforms to the UMTS standard.*

*32. A method for communicating over a cellular wireless network, the method comprising, at a portable user equipment (UE):*

*determining a selected radio bandwidth of a single frequency channel based upon an integer multiple of a first bandwidth, wherein the radio bandwidth selected has a width of the first bandwidth or an integer multiple of the first bandwidth: and*

*communicating on the single frequency channel with at least one base station using a signal comprising at least one data bearing sub channel in a time-division mode, wherein the communicating comprises:*

*inverse multiplexing the signal into multiple downlink data bearing signals; and*

*transmitting the multiple downlink data bearing signals simultaneously in the sub channels at individual data rates that combine to an aggregate data rate.*

*33. The method of claim 32, wherein the first bandwidth is no greater than about 6 MHz.*

*34. The method of claim 33, wherein the selected radio bandwidth is selectable from a group consisting of 6, 12, 18 and 24 MHz.*

*35. The method of claim 34, wherein the signal has a net data rate in a range of 1.5-6.0 Mbps.*

*36. The method of claim 32, wherein the signal conforms to the UMTS standard.*

* * * * *